(12) United States Patent
Clabby et al.

(10) Patent No.: US 12,721,265 B2
(45) Date of Patent: Sep. 1, 2026

(54) CONTROL AND MONITORING SYSTEMS AND METHODS FOR AUXILIARY POWER USAGE ADJUSTMENT FOR TEMPORARY ENGAGEMENT

(71) Applicant: Deere & Company, Moline, IL (US)

(72) Inventors: Nathan A Clabby, Milan, IL (US); Scott N. Clark, Bettendorf, IA (US)

(73) Assignee: Deere & Company, Moline, IL (US)

( * ) Notice: Subject to any disclaimer, the term of this patent is extended or adjusted under 35 U.S.C. 154(b) by 12 days.

(21) Appl. No.: 18/755,277

(22) Filed: Jun. 26, 2024

(65) Prior Publication Data

US 2026/0000019 A1 Jan. 1, 2026

(51) Int. Cl.
*A01D 41/127* (2006.01)
*B60H 1/00* (2006.01)

(52) U.S. Cl.
CPC ......... *A01D 41/127* (2013.01); *B60H 1/0073* (2019.05)

(58) Field of Classification Search
CPC ..... B60W 10/04; A01D 41/127; E02F 9/2095
See application file for complete search history.

(56) References Cited

U.S. PATENT DOCUMENTS 6,655,351 B2 12/2003 David et al.
10,481,628 B2 * 11/2019 French, Jr. ........... A01D 41/127
11,439,064 B2 9/2022 Sheidler
11,864,483 B2 1/2024 Vandike et al.
2010/0293911 A1 * 11/2010 Mackin ............. A01D 41/1274 56/10.2 G
2015/0361627 A1 * 12/2015 Frelich ................. B60W 10/30 180/65.245
2022/0034064 A1 * 2/2022 Gorman ................ E02F 9/0808
2023/0029905 A1 2/2023 Clark
2023/0193594 A1 * 6/2023 Young ..................... E02F 3/422 701/22
2023/0320271 A1 * 10/2023 Clark .................... B60W 10/30 701/36
2023/0322202 A1 10/2023 Clark et al.
2024/0151188 A1 * 5/2024 Clark ...................... F02D 41/04
2025/0122695 A1 * 4/2025 Kennedy ............... E02F 9/2095

* cited by examiner

*Primary Examiner* — Long T Tran

(74) *Attorney, Agent, or Firm* — Christopher J. Volkmann; KELLY, HOLT & CHRISTENSON PLLC

(57) ABSTRACT

An agricultural system includes one or more processors and memory storing instructions that, executable by the one or more processors. The instructions, when executed by the one or more processors, causing the one or more processors to identify a power usage across an agricultural work machine; identify a temporary engagement to be executed by the agricultural work machine; generate power usage adjustment instructions based on the temporary engagement; and control one or more auxiliary subsystems based on the power usage adjustment instructions.

19 Claims, 10 Drawing Sheets

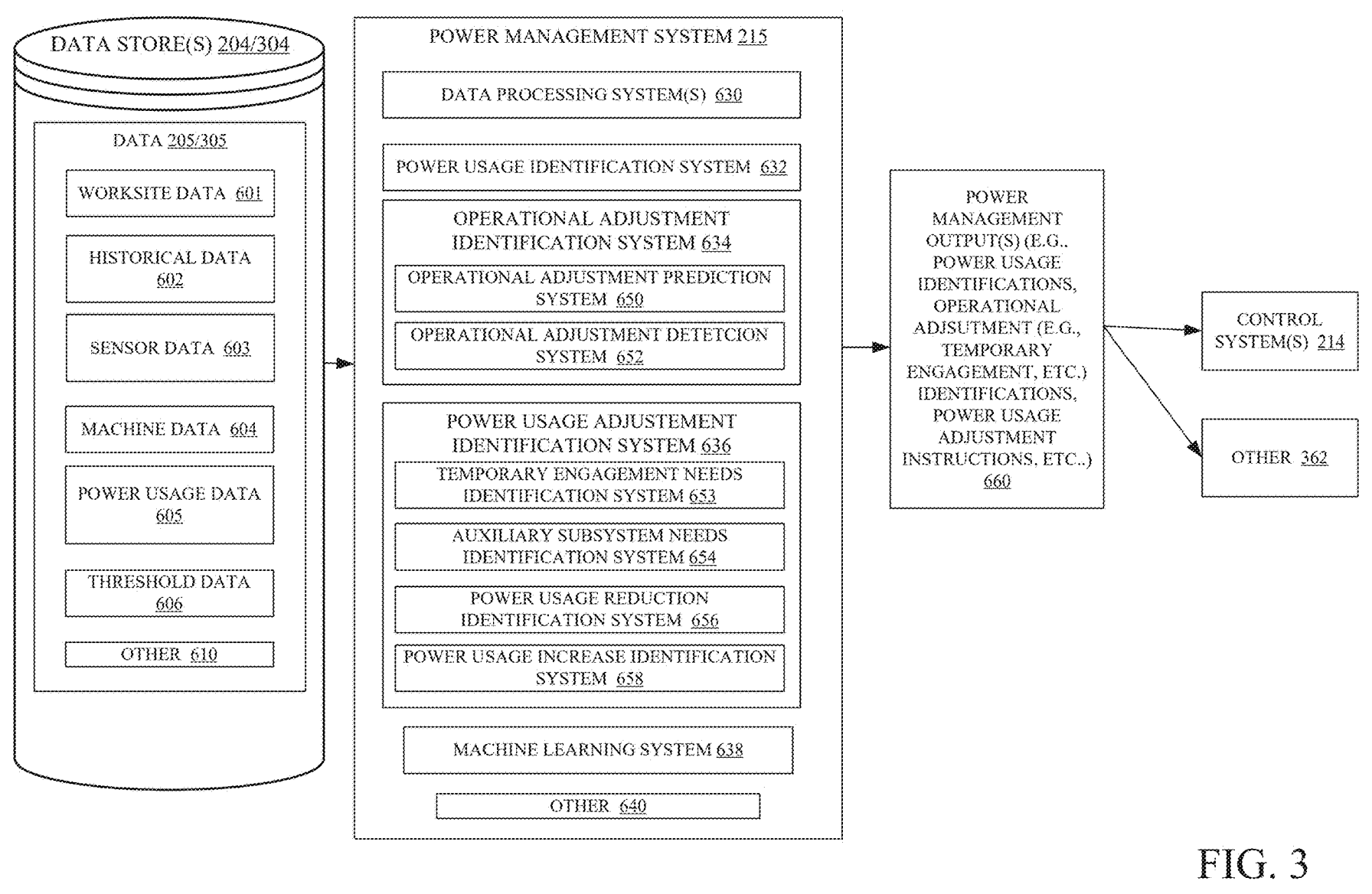

DATA STORE(S) 204/304
DATA 205/305
WORKSITE DATA 601
HISTORICAL DATA 602
SENSOR DATA 603
MACHINE DATA 604
POWER USAGE DATA 605
THRESHOLD DATA 606
OTHER 610

POWER MANAGEMENT SYSTEM 215
DATA PROCESSING SYSTEM(S) 630
POWER USAGE IDENTIFICATION SYSTEM 632
OPERATIONAL ADJUSTMENT IDENTIFICATION SYSTEM 634
OPERATIONAL ADJUSTMENT PREDICTION SYSTEM 650
OPERATIONAL ADJUSTMENT DETETCION SYSTEM 652
POWER USAGE ADJUSTEMENT IDENTIFICATION SYSTEM 636
TEMPORARY ENGAGEMENT NEEDS IDENTIFICATION SYSTEM 653
AUXILIARY SUBSYSTEM NEEDS IDENTIFICATION SYSTEM 654
POWER USAGE REDUCTION IDENTIFICATION SYSTEM 656
POWER USAGE INCREASE IDENTIFICATION SYSTEM 658
MACHINE LEARNING SYSTEM 638
OTHER 640

POWER MANAGEMENT OUTPUT(S) (E.G., POWER USAGE IDENTIFICATIONS, OPERATIONAL ADJSUTMENT (E.G., TEMPORARY ENGAGEMENT, ETC.) IDENTIFICATIONS, POWER USAGE ADJUSTMENT INSTRUCTIONS, ETC..) 660

CONTROL SYSTEM(S) 214
OTHER 362

FIG. 3

CONTROL AND MONITORING SYSTEMS AND METHODS FOR AUXILIARY POWER USAGE ADJUSTMENT FOR TEMPORARY ENGAGEMENT

FIELD OF THE DESCRIPTION

The present description relates to agricultural work machines. More specifically, the present description relates to power monitoring and control for agricultural work machines.

BACKGROUND

There are a wide variety of different types of agricultural work machines. One example of an agricultural work machine is an agricultural harvester, such as a combine harvester. An agricultural work machine includes an on-board power plant, which can include an internal combustion engine, that power other components of the agricultural harvester. The power demand of the agricultural work machine, and of individual components, can vary throughout the course of an agricultural operation (e.g., harvesting operation, etc.).

The discussion above is merely provided for general background information and is not intended to be used as an aid in determining the scope of the claimed subject matter.

SUMMARY

An agricultural system includes one or more processors and memory storing instructions executable by the one or more processors. The instructions, when executed by the one or more processors, causing the one or more processors to identify a power usage across an agricultural work machine; identify a temporary engagement to be executed by the agricultural work machine; generate power usage adjustment instructions based on the temporary engagement; and control one or more auxiliary subsystems based on the power usage adjustment instructions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 is a block diagram showing some examples of components of the agricultural system architecture, including a power management system, in more detail.

DETAILED DESCRIPTION

Figure 1:
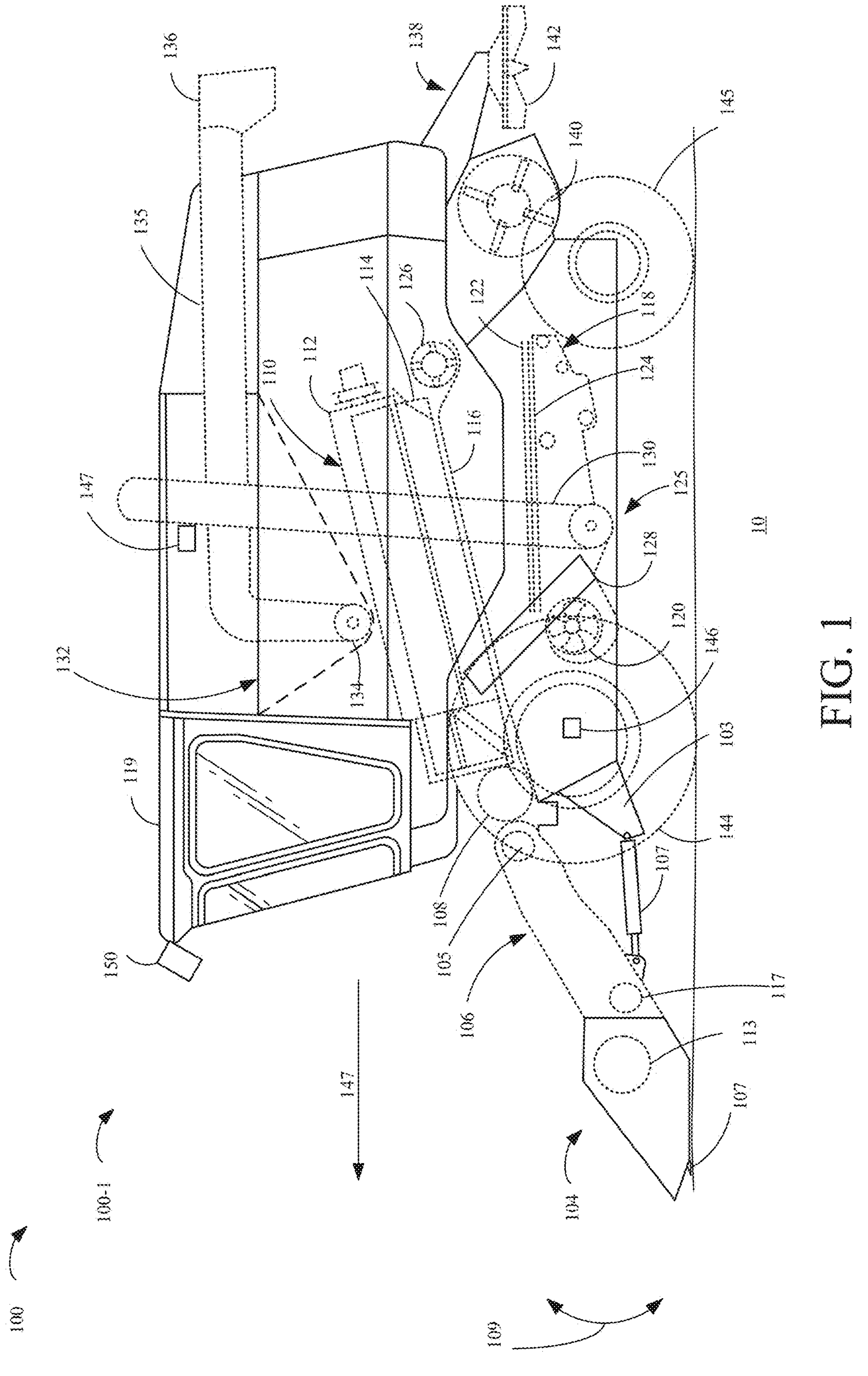
FIG. 1 is a partial pictorial, partial schematic illustration showing an example agricultural work machine in the form of an agricultural harvester.

For the purpose of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example can be combined with the features, components, and/or steps described with respect to other examples of the present disclosure.

In current systems, during an agricultural operation, an agricultural work machine is controlled to operate at or near the system power limit. Operating at or near the system power limit is often preferable to increase machine productivity. However, throughout the course of an agricultural operation, the agricultural work machine can be controlled to perform operational adjustments, such as to account for changing conditions at the worksite (e.g., field), such as changing crop conditions, changing terrain conditions, as well as various other conditions.

Operational adjustments include adjustments to operational settings of the agricultural work machine, such as the travel speed of the agricultural work machine, the speed of a component of the agricultural work machine, the position or orientation of a component of the agricultural work machine, the operating pressure of a component of the agricultural work machine, as well as other operational settings. One example of an operational adjustment is a temporary engagement. Temporary engagements can include, for example, gear shifts or (temporary) activation of a subsystem.

One example of an agricultural work machine is an agricultural harvester. An agricultural harvester performs, as an agricultural operation, harvesting at a worksite. During the course of a harvesting operation, the agricultural harvester may be controlled to operate at or near the system power limit. At various times throughout the course of the harvesting operation, the agricultural harvester can be controlled to perform operational adjustments, such as temporary engagements as well as various other operational adjustments. For example, the agricultural harvester can be controlled to perform, as a temporary engagement, a gear change to change a gear of a backshaft drive system to increase or decrease the speed of a backshaft to adjust for changing crop conditions. In another example, the agricultural harvester can be controlled to perform, as a temporary engagement, a gear change to change a gear of a propulsion drive system to adjust for changing crop or worksite conditions. In another example, the agricultural harvester can be controlled to, as a temporary engagement, temporarily activate one or more sub-operation subsystems. For instance, the agricultural harvester can be controlled to activate a conveying mechanism (e.g., auger, blower, elevator, etc.) of an unloading subsystem that is actuated to unload harvested crop from the agricultural harvester and is deactivated when the unloading operation is completed.

Operational adjustments, such as temporary engagements, require power (i.e., have a power demand). When the agricultural work machine is operating at or near the system power limit, the power demand of the operational adjustments (e.g. temporary engagements, etc.) can cause reduced performance of other systems of the agricultural work machine. For example, the travel speed of the agricultural work machine, or the speed of rotation of components of the work machine, may be reduced during temporary engagements, such as gear shifts or activation of an auxiliary subsystem. The reduced performance can have a deleterious effect on the quality and profitability of the agricultural operation.

Disclosed herein are systems and methods for monitoring power demand and power usage and controlling an agricultural work machine to account for operational adjustments, such as temporary engagements, during the course of an agricultural operation. The systems and methods disclosed herein provide for adjusting operation of the agricultural work machine to prevent or reduce the deleterious effects of operational adjustments, such as temporary engagements, on agricultural work machine performance. The systems and methods disclosed herein provide for identifying (e.g., detecting or predicting) operational adjustments, such as temporary engagements, and adjusting power usage on the agricultural work machine to account for the identified operational adjustments, such as for identified temporary engagements. Adjusting the power usage can include reducing, including eliminating, the power usage of one or more auxiliary subsystems in response to identified operational adjustments, such as identified temporary engagements. Further, adjusting the power usage can include temporarily increasing, prior to execution of the one or more operational adjustments, such as one or more temporary engagements, the power usage of one or more auxiliary subsystems.

Figure 2:
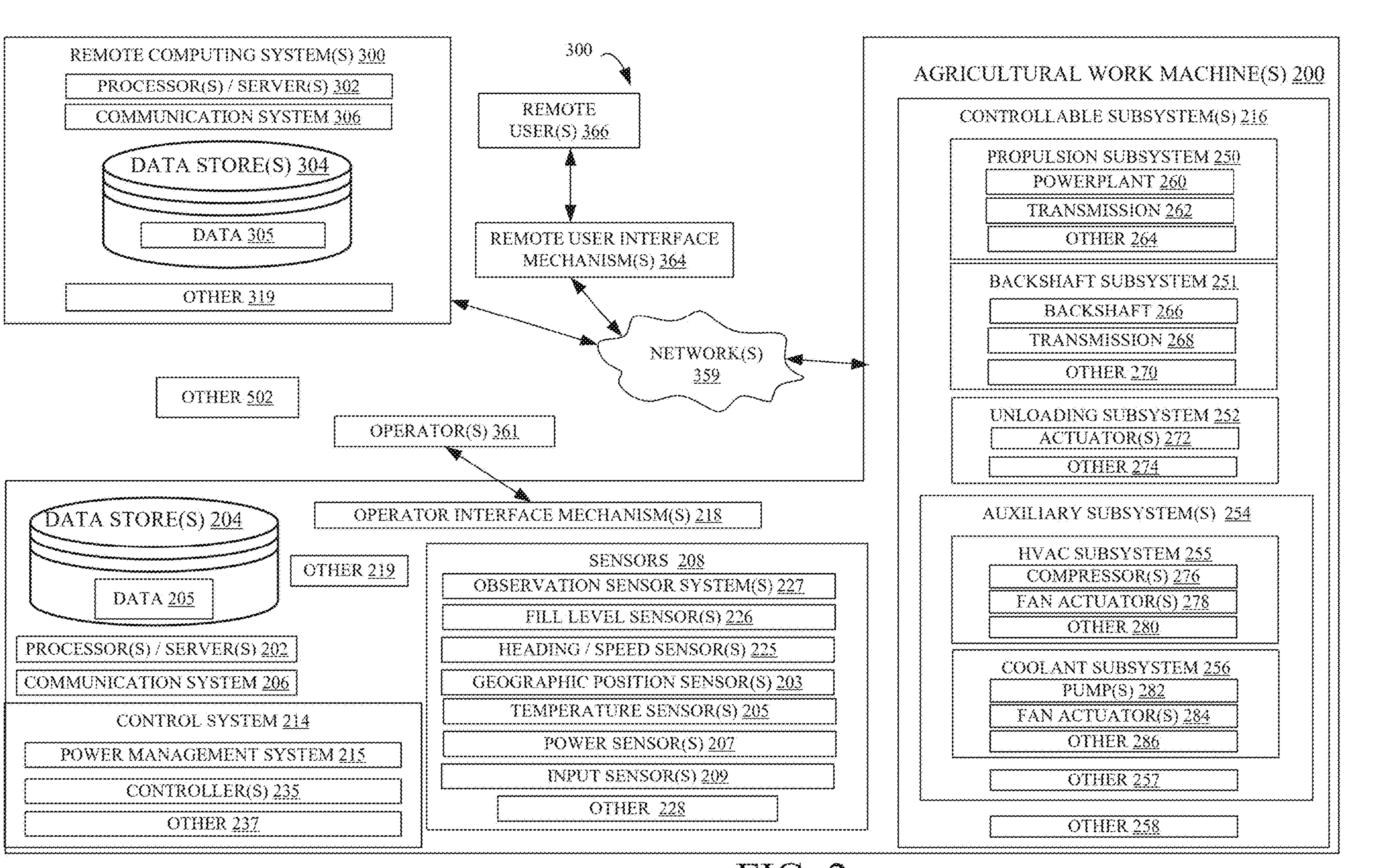
FIG. 2 is a block diagram of one example agricultural system architecture.

FIG. 1 is partial pictorial, partial schematic illustration of an example agricultural work machine 100 in the form of an agricultural harvester 100-1 (illustratively a combine harvester). Agricultural harvester 100-1 is also referred to as harvester 100-1. As illustrated in FIG. 2, harvester 100-1 includes ground engaging traction elements (wheels or tracks) 144 and 145 which can be driven by a propulsion subsystem (e.g., powerplant (e.g., internal combustion engine, etc.) hydrostatic drive, and other drivetrain elements, such as a gear box/transmission) to propel harvester 100-1 across a worksite 10 (e.g., a field). Harvester 100-1 includes an operator compartment or cab 119, which can include a variety of different operator interface mechanisms (e.g., 218 shown in FIG. 2) for controlling harvester 100-1 as well as for presenting (e.g., displaying, etc.) various information and providing for operator input. Harvester 100-1 includes a feeder house 106, a feed accelerator 108, and a thresher generally indicated at 110. The feeder house 106 and the feed accelerator 108 form part of a material handling subsystem 125. Header 104 is pivotally coupled to a frame 103 of harvester 100-1 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, agricultural harvester 100-1 can also include one or more actuators that operate to apply a tilt angle, a roll angle, or both to the header 104 or portions of header 104.

Feederhouse 106 also includes backshaft (or header backshaft) 117. Backshaft 117 is coupled to (e.g., via a drive assembly, such as belts, shafts, pulleys, and gears/transmission) to the powerplant (e.g., internal combustion engine) of the harvester 100-1. The backshaft drive assembly includes a variable transmission (e.g., multiple gears) which can be controllably shifted to adjust operation (e.g., rotational speed) of the backshaft 117. The rotational output of the backshaft 117 is used to power (or drive) various components of the header 104, including, but not limited to, the conveyor 113 (e.g., auger, belts, etc.). The backshaft 117 can drive or power the header components via a header component drive assembly (not shown).

Agricultural harvester 100-1 includes a material handling subsystem 125 that includes a thresher 110 which illustratively includes a threshing rotor 112 and a set of concaves 114. Further, material handling subsystem 125 also includes a separator 116. Agricultural harvester 100-1 also includes a cleaning subsystem or cleaning shoe (collectively referred to as cleaning subsystem 118) that includes cleaning fan(s) 120, chaffer 122, and sieve 124. The material handling subsystem 125 also includes discharge beater 126, tailings elevator 128, and clean grain elevator 130. The clean grain elevator moves clean grain into a material receptacle (or clean grain tank) 132.

Harvester 100-1 also includes an unloading subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger or blower. Conveying mechanism 134 is in communication with clean grain tank 132 and is driven (via a conveying mechanism drive assembly) to convey material from grain tank 132 through chute 135 and spout 136. Chute 135 is rotatable through a range of positions from a storage position (shown in FIG. 1) to a variety of deployed positions away from agricultural harvester 100-1 to align spout 136 relative to a material receptacle of a material receiving machine that is configured to receive the material within grain tank 132. One example of such a deployed position is shown in FIG. 1. Spout 136, in some examples, is also rotatable, by an actuator, to adjust the direction of the material stream exiting spout 136.

Harvester 100-1 also includes a residue subsystem 138 that can include chopper 140 and spreader 142. In some examples, a harvester within the scope of the present disclosure can have more than one of any of the subsystems mentioned above. In some examples, harvester 100-1 can have left and right cleaning subsystems, separators, etc., which are not shown in FIG. 1.

In operation, and by way of overview, harvester 100-1 illustratively moves through a field 10 in the direction indicated by arrow 147. As harvester 100-1 moves, header 104 engages the crop plants to be harvested and cuts, with a cutter bar 107 on the header 104, the crop plants to generate cut crop material.

The cut crop material is engaged by conveyor 113 (e.g., cross auger, belts, etc.) which conveys the severed crop material to a center of the header 104 where the severed crop material is then moved through an opening to a conveyor (e.g., belt(s)) in feeder house 106 toward feed accelerator 108, which accelerates the severed crop material into thresher 110. The severed crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142.

In other configurations, the residue is released from the agricultural harvester 100-1 in a windrow. Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by one or more cleaning fans 120. Cleaning fans 120 direct air along an airflow path upwardly through the sieves and chaffers. The airflow carries residue rearwardly in harvester 100-1 toward the residue handling subsystem 138.

Tailings elevator 128 returns tailings to thresher 110 where the tailings are re-threshed. Alternatively, the tailings also can be passed to a separate re-threshing mechanism by a tailings elevator or another transport device where the tailings are re-threshed as well.

Harvester 100-1 can include a variety of sensors, some of which are illustrated in FIG. 1, such as ground speed sensor 146, one or more mass flow sensors 147, and one or more crop loss sensor systems 150.

Ground speed sensor 146 senses the travel speed of harvester 100-1 over the ground. Ground speed sensor 146 can sense the travel speed of the harvester 100-1 by sensing the speed of rotation of the ground engaging traction elements 144 or 145, or both, a drive shaft, an axle, or other components. In some instances, the travel speed can be sensed using a positioning system, such as a global positioning system (GPS), a dead reckoning system, a long-range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvester 100-1 is on a slope, the orientation of harvester 100-1 relative to the slope is known. For example, an orientation of harvester 100-1 could include ascending, descending or transversely travelling the slope.

Mass flow sensors 147 sense the mass flow of material (e.g., grain) through clean grain elevator 130. Mass flow sensors 147 can be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor.

Observation sensor systems 150 can include one or more of a variety of sensors, such as cameras (e.g., mono cameras, stereo cameras, color (e.g. RGB) cameras, multispectral cameras, thermal camera, infrared cameras, near-infrared cameras, etc.), lidar sensors, radar sensors, terahertz sensors as well as various other sensor configured to emit and/or receive electromagnetic radiation, ultrasonic sensors, as well as a variety of other sensors. Observation sensor systems 150 can illustratively detect various attributes at the worksite 10. While FIG. 1 shows some example positions of an observation sensor system 150, it will be understood that observation sensor systems 150 can, alternatively or additionally, be positioned (or otherwise disposed) at a variety of other locations on harvester 100-1.

A harvester 100-1 can include various other sensors, some of which will be described in FIG. 2. For example, as will be described in FIG. 5, a harvester 100 can include one or more power sensors to detect the power demand (or usage) of one or more components of the A harvester 100 can include various other items, some of which will be described in FIG. 2. For example, but not by limitation, a harvester 100-1 can include one or more controllable auxiliary subsystems.

FIG. 2 is a block diagram showing one example agricultural system architecture 300 (hereinafter also referred to as agricultural system 500 or as system 500). Agricultural system 500 includes one or more agricultural work machines 200 (e.g., one or more harvesters 100-1, etc.), one or more remote computing systems 300, one or more networks 359, one or more remote user interface mechanisms 364, and can include a variety of other items 502 as well.

Each harvester 100, itself, illustratively includes one or more processors or servers 402, one or more data stores 404, communication system 406, one or more sensors 408, control system 414, one or more controllable subsystems 416, one or more operator interface mechanisms 418, and can include various other items and functionality 419 as well.

Remote computing systems 300, as illustrated, include one or more processors or servers 302, one or more data stores 304, communication system 306, and can include various other items and functionality 319.

Data stores 204 and data stores 304 each store a variety of data (generally indicated as data 205 and data 305, respectively), some of which will be described in more detail herein. For example, data 205 and data 305 or a combination thereof, can include, among other things, worksite data, historical data, sensor data, machine data, power usage data, threshold data, as well as various other data. Some examples of the various data will be described in more detail in FIG. 3. Additionally, data 205 can include computer executable instructions that are executable by one or more processors or servers 202 to implement other items or functionalities of system 500, including other items or functionalities of agricultural work machines 200. Additionally, data 305 can include computer executable instructions that are executable by one or more processors or servers 302 to implement other items or functionalities of system 500, including other items of remote computing systems 300. It will be understood that data stores 204 and data stores 304 can include different forms of data stores, for instance both volatile data stores (e.g., Random Access Memory (RAM)) and non-volatile data stores (e.g., Read Only Memory (ROM), hard drives, solid state drives, etc.).

Sensors 208 can include one or observation sensor systems 427, one or more fill level sensors 226, one or more heading/speed sensors 225, one or more geographic position sensors 203, one or more temperature sensors 205, one or more power sensors 207, one or more input sensors 209, and can include various other sensors 228 as well.

Heading/speed sensors 225 detect a heading characteristic (e.g., travel direction) or speed characteristic (e.g., travel speed, acceleration, deceleration, etc.), or both, of an agricultural work machine 100. This can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors 203. Thus, while heading/speed sensors 225 as described herein are shown as separate from geographic position sensors 203, in some examples, machine heading/speed is derived from signals received from geographic position sensors 203 and subsequent processing. In other examples, heading/speed sensors 225 are separate sensors and do not utilize signals received from other sources. One example of heading/speed sensors 225 are sensors 146 shown in FIG. 1.

Geographic position sensors 203 illustratively sense or detect the geographic position or location of a harvester 100. Geographic position sensors 203 can include, but are not limited to, a global navigation satellite system (GNSS) receiver that receives signals from a GNSS satellite transmitter. Geographic position sensors 203 can also include a real-time kinematic (RTK) component that is configured to enhance the precision of position data derived from the GNSS signal. Geographic position sensors 203 can include a dead reckoning system, a cellular triangulation system, or any of a variety of other geographic position sensors.

Observation sensor systems 427 detect one or more attributes at the worksite, for example, crop attributes, terrain attributes, as well as various other attributes. One example of observation sensor systems 427 are observation sensor systems 150.

Fill level sensors 426 detect a fill level of an on-board material receptacle (e.g., 132). In one example, fill level sensors 426 can be mass flow sensors, such as mass flow sensors 147. In other examples, fill level sensors 426 can include electromagnetic radiation sensors (e.g., cameras, lidar, radar, light sensors (e.g., beam break, etc.)) that emit and/or receive electromagnetic radiation that is reflected from material in the on-board material tank. In other examples, fill level sensors 426 can include contact devices that are deflected or otherwise moved by contact with the material.

Temperature sensors 205 detect a temperature associated with various areas or items of a mobile work machine 426. For example, temperature sensors 205 can include temperature sensors that detect a temperature of an operator compartment (e.g., cab or cabin), such as the temperature of operator compartment 119. Temperature sensors 205 can include temperature sensors that detect a temperature of a powerplant bay (e.g., engine bay) or of fluid (e.g., air, etc.) provided to or provided to cool the powerplant (e.g., charge air cooler outlet temperature sensor, etc.). Some examples of temperature sensors are thermistors, resistance temperature detectors, thermocouples, and semiconductor-based integrated sensors.

Power sensors 205 detect a power demand or usage of various items or subsystems 216 of an agricultural work machine. Examples of power sensors 205 include, but are not limited to, voltage sensors, current sensors, torque sensors, hydraulic pressure sensors, bearing load sensors, and rotational sensors (e.g., rotary transducers, rotary encoders, etc.). Power demand or usage can be detected at various levels of granularity, for instance, power demand or usage can be sensed machine-wide, subsystem-wide, or by individual components.

Input sensors 209 detect control inputs (e.g., provided by operator or user input) or output by control system 214, for controlling work machine 100 to perform temporary engagements, such as control inputs to command a gear change or control inputs to active one or more actuators (e.g., 272) to control a subsystem (e.g. 252) to perform a temporary sub-operation (e.g., unloading). Input sensors 209 can include software based sensors that detect operator interaction with operator interface mechanisms 218 or that detect an output (e.g., instructions, command, etc.) of control system 214. Input sensors 219 can include physical sensors that detect movement or position of various items, such as movement or position of input mechanisms (e.g., control knobs, buttons, sticks, etc.) of operator input mechanisms 218, or movement or position of other items such as movement or position of the items involved in the temporary engagement (e.g., actuators, gears, other items).

Sensors 208 can also include various other types of sensors 228.

Control system 214 can include power management system 215. Briefly, power management system 215 monitors and control power usage or demand of a work machine 100. Power management system 215 will be discussed in more detail in FIG. 3.

Control system 214 can include one or more controllers 235 (e.g., electronic control units, which can be implemented by one or more processors, such as one or more processors 202) that generate control signals to control one or more components of a work machine 100 or components of system 500, or both. For example, but not by limitation, controllers 435 can include, a communication system controller to control communication system 206, an interface controller to control one or more interface mechanisms (e.g., 218 or 364, or both), a propulsion controller to control propulsion subsystem 250, a backshaft subsystem controller to control backshaft subsystem 251, an unloading subsystem controller to control unloading subsystem 252, auxiliary subsystem controller(s) to control auxiliary subsystems 254, such as an HVAC controller to control HVAC subsystem 255, coolant subsystem controller to control coolant subsystem 256, as well as various other controllers to control various other controllable subsystems 216. In other examples, a central controller can be used to generate control signals to control a plurality of the controllable subsystems 216 as well, in some examples, other items of system 500. Thus, it will be understood that a distinct controller can be used to control each item or each subsystem of a work machine 100 or that a controller can control one or more items or one or more subsystems of a work machine, including a controller that controls all items (including all subsystems) of a work machine 100. Control system 214 can include various other items 237 as well.

Controllable subsystems 216 can include propulsion subsystem 250, backshaft subsystem 251, unloading subsystem 252, one or more auxiliary subsystems 254, and can include various other controllable subsystems 258, some examples of which are discussed in FIG. 1 (e.g., header position/orientation actuators, material handling subsystem, residue subsystem, cleaning subsystem, etc.). The other controllable subsystems 258 can include a variety of components, including one or more of a variety of actuators. Propulsion subsystem 250, itself, includes powerplant 260, transmission 262, and can include other items 264 as well. Backshaft subsystem 251, itself, includes backshaft 266 (e.g., 117), transmission 268, and can include other items 270 as well. Unloading subsystem 252, itself, includes one or more actuators 272, and can include various other items 274, some examples of which are shown in FIG. 1 (e.g. 134, 135, 136). Auxiliary subsystems 254 can include heating, ventilation, and air conditioning (HVAC) subsystem 255, coolant subsystem 256, and can include various other auxiliary subsystems 257. HVAC subsystem 255, itself, can include one or more compressors 276, one or more fan actuators 278, and can include various other items 280 as well. Coolant subsystem 256, itself, can include one or more pumps 282, one or more fan actuators 284, and can include various other items 286, as well.

Propulsion subsystem 250 is controllable to control a travel speed of the work machine, and to further control a power output or generation. For example, powerplant 260 (e.g., internal combustion engine, etc.) can be controlled to increase a power output or generation (e.g., increase throttle, etc.) such as by increasing the speed (e.g., RPMs) of the powerplant. Further, transmission 262 can be controlled to change gears to increase or decrease the travel speed of the work machine 100.

Backshaft subsystem 250 is controllable to control a rotational speed of the backshaft 266, such as by controlling transmission 268 to change gears.

Unloading subsystem 250 is controllable to perform an unloading operation (e.g., transferring material from an on-board material receptacle to another location, such as another machine). Actuators 272 can include an actuator (e.g., hydraulic motor, electric motor, etc.) to drive a conveying mechanism (e.g., 134) to convey the material. Actuators 272 can also include one or more actuators (e.g., hydraulic cylinders, linear actuators, etc.) to moveably position items (e.g., 135, 136) of the unloading subsystem.

HVAC subsystem 255 is controllable to provide air (e.g., heated or cooled air) to the operator compartment (e.g., 119) of the work machine 100 to change and control a temperature of the operator compartment. Compressors 276 are controllable to compress refrigerant and move refrigerant through other items 280 of the system (e.g., condenser, dryer, evaporator, etc.) to cool the operator compartment. Fan actuators 278 are controllable to control operating parameters of HVAC system fans (or blowers). The HVAC subsystem can include, as other items 280, fans (or blowers) that blow air across the evaporator (to cool the operator compartment) or across a heater core (to heat the operator compartment. Fan actuators 278 can include actuators (e.g., motors, etc.) that control the movement (e.g., rotation) of the fans (or blowers). In some examples, the fans (or blowers) can have variable pitch, in which case, fan actuators 278 can include actuators (e.g., linear actuators, etc.) to adjust the pitch of the fans or blowers.

Coolant subsystem 256 is controllable to cool the powerplant 260 or powerplant bay of the work machine 100. Pumps 282 (e.g., sometimes referred to as water pumps) are controllable to pump coolant through other items 286 of the system (e.g., cylinder block, radiator, etc.) to cool the powerplant or powerplant bay of the work machine 100. In some examples, the coolant subsystem 256 can include, as other items 286, one or more fans (or blowers) that pull or push air through the radiator. In some examples, the fan (or blowers) can have variable speed, in which case, fan actuators 284 can include actuators (e.g., motors, etc.) that control movement (e.g., rotation) and speed of movement (e.g., speed of rotation) of the fans (or blowers). In some examples, the fans (or blowers) can have variable pitch, in which case, fan actuators 284 can include actuators (e.g., linear actuators, etc.) to adjust the pitch of the fans or blowers. Communication system 206 is used to communicate between components of a work machine 100 or with other items of system 500, such as remote computing systems 300, other work machines 100, or user interface mechanisms 364, or a combination thereof. Communication system 306 is used to communicate between components of a remote computing system 300 or with other items of system 500, such as work machines 100, other remote computing systems 300, or user interface mechanisms 364, or a combination thereof.

Communication systems 206 and 306 can each include one or more of wired communication circuitry or wireless communication circuitry, as well as wired and wireless communication components. In some examples, communication systems 206 and 306 can each be one or more of a system for communicating over the Internet, a system for communicating over a cellular network, a system for communicating over a wide area network or a local area network, a system for communicating over a controller area network (CAN), such as a CAN bus, a system for communicating over a controller area network flexible data-rate (CAN FD), such as CAN FD bus, a system for communicating over a near field communication network, a system for communicating over ethernet, or a communication system configured to communicate over any of a variety of other networks. Communication systems 206 and 306 can each also include a system that facilitates downloads or transfers of information to and from a secure digital (SD) card or a universal serial bus (USB) card, or both. Communication systems 206 and 306 can each utilize network 359. Networks 359 can be any of a wide variety of different types of networks such as the Internet, a cellular network, a wide area network (WAN), a local area network (LAN), a controller area network (CAN), a controller area network flexible data-rate (CAN FD), a near-field communication network, ethernet, or any of a wide variety of other networks.

FIG. 2 shows that one or more operators 361 can operate work machines 100. The operators 361 interact with operator interface mechanisms 218. In some examples, operator interface mechanisms 218 can each include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the operators 361 can interact with operator interface mechanisms 218 using touch gestures. Additionally, at least some of the operator interface mechanisms 218 can be used to present (e.g., display, audible presentation, haptic presentation, etc.) various information. The examples described above are provided as illustrative examples and are not intended to limit the scope of the present disclosure. Consequently, other types of operator interface mechanisms 218 can be used and are within the scope of the present disclosure.

In one example, an operator interface mechanism 218, such as a display device or other device, can include buttons (e.g., displayed buttons or physical buttons) for adjusting enabling and disabling power management system 215 (or functionality thereof) and for adjusting settings (e.g., sensitivity, aggressiveness, thresholds, etc.) of power management system 215. For example, power management system 215 is operable to automatically control work machine 100. By automatically, it is meant without manual involvement except perhaps to enable power management system 215 or functionality thereof such as through the buttons discussed above.

FIG. 2 also shows remote users 366 interacting with work machines 100 and remote computing systems 300 through user interface mechanisms 364 over networks 359. In some examples, user interface mechanisms 364 can include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the users 366 can interact with user interface mechanisms 364 using touch gestures. Additionally, at least some of the user interface mechanisms 364 can be used to present (e.g., display, audible presentation, haptic presentation, etc.) various information. The examples described above are provided as illustrative examples and are not intended to limit the scope of the present disclosure. Consequently, other types of user interface mechanisms 364 can be used and are within the scope of the present disclosure.

Remote computing systems 300 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems.

In one example, work machines 100 can be controlled remotely by remote computing systems 300 or by remote users 366, or both. In some examples, operators 361 are on-board (e.g., in an operator compartment, such as a cab) the work machines 100. In some examples, operators 361 are remote from the work machines 100 and control the machines through one or more interface mechanisms (e.g. one or more of 218) which are remote from the machines but operatively coupled (e.g., communicatively coupled, such as over networks 359) to the machines.

It will be understood that, in some examples, items in system 500 can be distributed in various ways, including ways that differ from the example shown in FIG. 2. For example, but not by limitation, power management system 215, shown in FIG. 2 as being disposed on work machines 100, can be located elsewhere, such as at one or more remote computing systems 300. In yet other examples, power management system 215 can be distributed across one or more of a work machine and a remote computing system 300. Thus, it will be understood that power management system 215 can be distributed across system 500 in various ways.

FIG. 3 is a block diagram that shows examples of some of the components of system 500 in more detail and information flow between the components.

As illustrated in FIG. 3, it can be seen that data stores 204 and data stores 304 or a combination thereof, can include as data (205 and 305 respectively), worksite data 601, historical data 602, sensor data 603, machine data 605, power usage data 605, threshold data 606, and can include various other data 610, including, but not limited to, other data described elsewhere herein. In some examples, where the data is located can depend on where power management system 215 (also called system 215) is located.

As shown in FIG. 3, power management system 215, includes one or more data processing systems 630, power usage identification system 632, operational adjustment identification system 634, power usage adjustment identification system 636, machine learning system 638, and various other items and functionality 640. Operational adjustment identification system 634, itself, includes operational adjustment prediction system 650 and operational adjustment detection system 652. Power usage adjustment identification system 636, itself, includes operational adjustment needs identification system 653, auxiliary subsystem needs identification system 654, power usage reduction identification system 656, and power usage increase identification system 658 As will be described in more detail, system 235 is operable to generate one or more power management outputs 660.

Worksite data 601 can include data relative to the worksite (e.g., one or more fields) at which the work machines 100 perform the agricultural operation. Worksite data 501 can be in the form of overhead imagery or maps, or both, including or indicating values of one or more attributes of the worksite, such as, but not limited to, crop attribute values and terrain attribute values. Crop attribute values can include, for example, vegetation index values (e.g., Normalized Difference Vegetation Index (NDVI) values, etc.), yield values, crop height values, as well as values of various other crop attributes. Terrain attribute values can include, for example, topographic attribute values (e.g., elevation values, slope values, etc.), soil attribute values (e.g., soil moisture values, soil type values, etc.), field feature/obstacle values (e.g., values indicative of the presence, location, and type of field features or obstacles), as well as values of various other terrain attributes.

Historical data 602 can include data indicative of historical power usage or historical operational adjustments (e.g., historical temporary engagements, other historical operational adjustments), or both, at the worksite (e.g., power usage or operational adjustments (e.g., temporary engagements, etc.), or both, in historical agricultural operations at the worksite). Historical data 502 can be useful in predicting operational adjustments (e.g., temporary engagements, etc.) and power usage in a current agricultural operation at the worksite.

Sensor data 603 includes sensor data (e.g., images, sensor signals, etc.) generated by sensors 208, for example, observation sensor system sensor data generated by observation sensor systems 227, fill level sensor data generate by fill level sensors 226, heading/speed sensor data generated by heading/speed sensors 225, geographic position sensor data generated by geographic position sensors 203, power sensor data generated by power sensors 207, input sensor data generated by input sensors 209, as well as various other sensor data generated by other sensors 228.

Machine data 604 includes data indicative of capacities of each of the work machine 100 such as data indicative of the power limit of each of the work machines 100, data indicative of the material fill capacity (e.g., capacity of on-board material receptacle), as well as various other data.

Power usage data 605 can include data utilizable by power management system 215 to identify power usage of the work machines 100, such as conversions, equations, models, look-up tables, as well as various other data. Additionally, power usage data 605 can include stored values indicating the power usage of various operational adjustments, such as stored values indicating the power usage of various temporary engagements, such as the power usage required for gear shifts or for an unloading operation, as well as the stored values indicative the power usage of various other operational adjustments.

Threshold data 606 includes data indicative of various thresholds, such as fill level thresholds, power usage adjustment thresholds, power management sensitivity thresholds, as well as various other thresholds. Threshold data 606 can be provided or adjusted by operator or user input. Threshold data 606 can be provided by various other sources, such as pre-set thresholds provided by a manufacturer or other third-party.

Data processing systems 630 process worksite data 601, historical data 602, sensor data 603, machine data 604, power usage data 605, threshold data 606, and other data 610 to generate processed data. The processed data can include computer readable values, useable (or readable) by other items of power management system 215. Data processing system can include various processing functionality, including image processing functionality, sensor signal processing functionality, filtering functionality, categorization functionality, normalization functionality, aggregation functionality, color extraction functionality, analog-to-digital conversion functionality, as well as various other data processing functionalities. It will be understood then that data processing systems 630 can, for example, convert analog signals to readable digital signals (or digital values). It will be understood that data processing systems 330 can, for example, process captured images to extract values (e.g., pixel values, etc.), and can further convert the extracted values. It will be understood that data processing systems 630 can perform pre-processing and post-processing. It will be understood that data processing systems 630 can perform various forms of aggregation on the extracted or converted values.

Power usage identification system 632 is operable to identify power usage across a work machine 100 at varying levels of granularity based on one or more items of data 205/305, such as based on, at least, sensor data 603 including, but not limited to, power sensor data generated by power sensors 207, as well as, in some examples, power usage data 605. Power usage identification system 632 is operable to detect machine-wide power usage (e.g., total power usage of the machine) which can be expressed in power units (e.g., kilowatt-hour (kW-h)) or as a percentage of the power limit of the work machine (e.g., 98%). Power usage identification system 632 is further operable to identify power usage on a subsystem level (e.g., propulsion subsystem power usage, backshaft subsystem power usage, unloading subsystem power usage, HVAC subsystem power usage, coolant subsystem power usage, other subsystem power usage.) which can, for each subsystem, be expressed in power units (e.g., kW-h) or as a percentage of the power limit of the work machine. Power usage identification system 632 is further operable to identify power usage on a component level (e.g., power usage of individual components of the work machine 100, including, individual components of a subsystem 216) which can, for each component, be expressed in power units (e.g., kW-h) or as a percentage of the power limit of the work machine.

Additionally, power usage identification system 632 is operable to identify power usage of operational adjustments (e.g., temporary engagements (e.g., gear shifts, temporary activations of a component/subsystem, etc.), etc.) based on one or more items of data 205/305, such as based on, at least, sensor data 603 including, but not limited to, power sensor data generated by power sensors 207, as well as, in some examples, power usage data 605.

Operational adjustment identification system 634 is operable to identify operational adjustments (e.g., temporary engagements (e.g., gear shifts, temporary activations of a component/subsystem, etc.), etc.) based on one or more items of data 205/305, such as one or more of worksite data 601, historical data 602, or sensor data 603.

Operational adjustment prediction system 650 is operable to predict upcoming operational adjustments (e.g., temporary engagements, etc.) based on upcoming attribute values or based on historical values corresponding to upcoming geographic locations. It will be understood that upcoming refers to geographic locations ahead of the work machine 100 relative to the route or travel direction of the work machine 100. For example, sensor data 603 (e.g., observation system sensor data generated by observation sensors 427) or worksite data 601 can provide attribute values, such as crop attribute values or terrain attribute values, and operational adjustment prediction system 650 can predict an upcoming operational adjustment (e.g., temporary engagement (e.g., gear shift, etc.), etc.) based on the upcoming attribute values. In one example, sensor data 603 (e.g., fill level sensor data generate by fill level sensors 226) can provide fill level values and operational adjustment prediction system 650 can predict an upcoming operational adjustment (e.g., a temporary engagement in the form of a temporary activation of unloading subsystem 252 or actuators 272 to perform an unloading operation) based on the fill level values. In another example, historical data 602 can provide values indicative of historical power usage or historical operational adjustments (e.g., historical temporary engagements, other historical operational adjustments) at upcoming geographic locations and operational adjustment prediction system 650 can predict upcoming operational adjustments (e.g., upcoming temporary engagements (e.g., gear shifts, temporary activation of component/subsystem, etc.), etc.) based on the values of historical power usage or historical operational adjustments (e.g., historical temporary engagements, other historical operational adjustments).

Operational adjustment detection system 652 is operable to detect commanded operational adjustments (e.g. commanded temporary engagements, other commanded operational adjustments) based on sensor data 603, such as, input sensor data generated by input sensors 609. For example, input sensors 609 may detect, as an input, an operator or user input commanding an operational adjustment (e.g., a temporary engagement, etc.) and based thereon, operational adjustment detection system 652 can detect a commanded operational adjustment (e.g., commanded temporary engagement, other commanded operational adjustment). In another example, input sensors 609 may detect, as an output, commanded operational adjustment instructions (e.g., commanded temporary engagement instructions, other commanded operational adjustment instructions) output by control system 214 and based thereon, operational adjustment detection system 652 can detect a commanded operational adjustment (e.g., commanded temporary engagement, other commanded operational adjustment).

Power usage adjustment identification system 636 is operable to determine if power usage of one or more auxiliary subsystems 254 should be adjusted to account for identified (upcoming or commanded) operational adjustments (e.g., identified temporary engagements, other identified operational adjustments) and, if so, how the power usage of the one or more auxiliary subsystems 254 is to be adjusted.

Operational adjustment needs identification system 653 is operable to identify the power needed to perform the identified operational adjustments (e.g., identified temporary engagements, other identified operational adjustments) based on the power usage of the work machine and the power usage of the operational adjustments (e.g. temporary engagements, other operational adjustments), as identified by power usage identification system 632. For example, if power usage identification system 632 identifies that the work machine is currently using 98% of the power limit and that the identified (upcoming or commanded) operational adjustment(s) (e.g., identified temporary engagement(s), other identified operational adjustment(s)) require 3% of the power limit, then operational adjustment needs identification system 653 can identify that at least a 1% reduction of the current power usage of the work machine is needed. In some examples, operational adjustment needs identification system 653 can further utilize thresholds of threshold data 606. For example, a threshold may instruct system 215 to keep work machine power usage at or below 98% of the power limit. In such a case, keeping with the above example, operational adjustment needs identification system 653 can identify that at least a 3% reduction of the current power usage of the work machine is needed. In some examples, based, at least, on the current power usage of the work machine and based on the power usage of the identified operational adjustment(s) (e.g. identified temporary engagement(s), other identified operational adjustment(s)) as identified by power usage identification system 632, operational adjustment needs identification system 653 can identify that a power usage adjustment is not needed to account for the identified operational adjustment(s) (e.g., identified temporary engagement(s), other identified operational adjustment(s)).

Auxiliary subsystem needs identification system 654 is operable to identify the needs of each of the auxiliary subsystems 254 of a work machine 100 based on one or more items of data 205/305, such as temperature sensor data generated by temperature sensors 205. For example, the needs of a coolant subsystem 256 can be based on temperature sensor data indicative of a temperature associated with the power plant or power plant bay (e.g., charge air cooler outlet temperature reading, etc.). In another example, the needs of a HVAC subsystem 255 can be based on temperature sensor data indicative of a temperature associated with the operator compartment (e.g., operator compartment temperature). Auxiliary subsystem needs identification system 654 can further compare the current temperatures detected to commanded temperatures (e.g., input by operator or user, set as thresholds, etc.).

Power usage reduction identification system 656 is operable to identify if power usage of one or more auxiliary subsystems 254 can be decreased to account for identified (upcoming or commanded) operational adjustment(s) (e.g., identified temporary engagement(s), other identified operational adjustment(s)) and, if so, how the power usage of the one or more auxiliary subsystems 254 is to be reduced. Power usage reduction identification system 656 is operable to identify if power usage of one or more auxiliary subsystems 254 can be decreased and, if so, how based on power usage identifications by system 632, operational adjustment needs identifications by system 653, and, in some examples, based on threshold data 606.

For example, it may be that power usage identification system 632 identifies that the one or more auxiliary subsystems 254 are not currently using power, in which case, power usage reduction identification system 656 identifies that power usage of the one or more auxiliary subsystems 254 cannot be reduced to account for the identified operational adjustment(s) (e.g., identified temporary engagement(s), other identified operational adjustment(s)). In another example, it may be that operational adjustments needs identification system 653 identifies that a power usage adjustment is not needed to account for the identified power adjustment(s) (e.g., identified temporary engagement(s), other identified operational adjustment(s)), in which case, power usage reduction identification system 656 identifies that power usage of the one or more auxiliary subsystems 254 need not be reduced to account for the identified operational adjustment(s) (e.g., identified temporary engagement(s), other identified operational adjustment(s)).

In another example, based on the power usage of the one or more auxiliary subsystems 254, as identified by system 632, and the power adjustment need, as identified by system 653, power usage reduction identification system 656 identifies that power usage of the one or more auxiliary subsystems 254 need to be reduced and the extent to which they are to be reduced and outputs power usage adjustment instructions, for use by one or more controllers 235, to control the one or more auxiliary subsystems 254 to bring about the identified power usage reduction. In some examples, the power usage adjustment instructions, commanding a power usage reduction, can be further based on threshold data 606. For example, there may be a threshold 606 commanding a reduction of power usage for one subsystem 254 over another subsystem 254 (e.g., the threshold may command that, where possible, the HVAC subsystem 255 power usage is to be reduced instead of the coolant subsystem 256 power usage or that the HVAC subsystem 255 power usage is to be reduced to the greatest extent possible to minimize the power usage reduction of the coolant subsystem 256). In another example, there may be a threshold 606 setting a limit to the amount the power usage of each of one or more auxiliary subsystems 254 can be reduced.

In some examples, it may be that, given the power usage of the one or more auxiliary subsystems 254, as identified by system 632, and the power adjustment need, as identified by system 653, the power usage of the one or more auxiliary subsystems 254 need to be lessened but not eliminated, in which case, the operating settings (e.g., fan speed, fan pitch, pump speed, compressor speed, etc.) of the one or more subsystems 254 need only be adjusted. In some examples, it may be that, given the power usage of the one or more auxiliary subsystems 254, as identified by system 632, and the power adjustment need, as identified by system 653, the power usage of the one or more auxiliary subsystems 254 need be eliminated, in which case, the one or more auxiliary subsystem 254 can be deactivated (e.g., turn off fans, pumps, compressors, etc.).

Power usage increase identification system 658 is operable to determine if power usage of one or more auxiliary subsystems 254 can be increased to account for identified (upcoming or commanded) operational adjustment(s) (e.g., identified temporary engagement(s), other identified operational adjustment(s)) and, if so, how the power usage of the one or more auxiliary subsystems 254 is to be increased based on power usage identifications by system 632, power usage reductions identified by system 656, auxiliary subsystem needs identification by system 654, thresholds of threshold data 606, and, in some examples, learning outputs by machine learning system 638 (as will be discussed below). For example, power usage increase identification system 658 can identify that power usage of one or more auxiliary subsystems 254 can be temporarily increased, prior to the time of execution of the identified operational adjustment(s) (e.g., identified temporary engagement(s), other identified operational adjustment(s)), to compensate for a power usage reduction during the identified operational adjustment(s) (e.g., identified temporary engagement(s), other identified operational adjustment(s)), in which case, the operating settings (e.g., fan speed, fan pitch, pump speed, compressor speed, etc.) of the one or more subsystems 254 can be adjusted to increase power usage. In the example of a coolant subsystem 256 or an HVAC subsystem 255, the temporary increase of power usage, prior to the operational adjustment execution (e.g., temporary engagement execution, other operational adjustment execution) can limit (or prevent) powerplant associated temperatures or operator compartment temperatures from exceeding desired levels due to the power usage reduction during the operational adjustment(s) (e.g., temporary engagement(s), other operational adjustment(s)). In some examples, the amount the power usage can be temporarily increased can based upon the current power usage of the work machine 100, as identified by system 632, as well as thresholds of threshold data 606. For example, if the machine 100 is currently operating at 97% of the power limit, the power usage of the one or more auxiliary subsystems 254 can only be increased to use another 3% of the total power limit. Further, there may be a threshold indicating that the total machine power usage is not to exceed 98%, in which case, the power usage of the one or more auxiliary subsystems 254 can only be increased to use another 1% of the total power limit. Still further, the power usage increase can be based on machine learning outputs of machine learning system 638 which can inform the amount of temporary power usage increase to compensate for the upcoming power reduction during the temporary engagements.

Power usage increase identification system 658 is further operable to generate power usage adjustment instructions to reactivate one or more auxiliary subsystems 254 (or components thereof) or to increase power usage of one or more auxiliary subsystems 254 after execution of the operational adjustment(s) (e.g., temporary engagement(s), other operational adjustment(s)), based on power usage identifications by system 632, thresholds of threshold data 606, and auxiliary subsystem needs identified by system 654. For example, power usage increase identification system 658 can identify if and when one or more auxiliary subsystems 254 can be reactivated after execution of operational adjustment(s) (e.g., temporary engagement(s), other operational adjustment(s)) based on power usage identifications by system 632, thresholds of threshold data 606, and auxiliary subsystem needs identified by system 654. In another example, power usage increase identification system 658 can identify how much power usage of one or more auxiliary subsystems 254 can or should be increased after execution of operational adjustment(s) (e.g., temporary engagements, other operational adjustment(s)) based on power usage identifications by system 632, thresholds of threshold data 606, and auxiliary subsystem needs identified by system 654.

Thus, it can be seen that power usage identification system 636 is operable to output power usage adjustment instructions to adjust power usage of one or more auxiliary subsystems 254 to account for identified operational adjustment(s) (e.g., identified temporary engagement(s), other identified operational adjustment(s)). In this way, detrimental effects to performance of the work machine 100 can be reduced or avoided. Further, the power usage adjustment instructions can, as discussed, command a temporary increase in power usage of one or more auxiliary subsystems 254, prior to the time of execution of the identified operational adjustment(s) (e.g., identified temporary engagement(s), other identified operational adjustment(s)), to compensate for a power usage reduction of the one or more auxiliary subsystems 254. Further, the power usage adjustment instructions can, as discussed, command reactivation or an increase in power usage of one or more auxiliary subsystems 254 after execution of the identified operational adjustment(s) (e.g., identified temporary engagement(s), other identified operational adjustment(s)). The power usage adjustment instructions are useable by one or more controllers 235 to control one or more auxiliary subsystems 254, such as to adjust settings of one or more components of each of the one or more auxiliary subsystems 254 or to deactivate or to activate the one or more subsystems 254 or one or more components thereof. The power usage adjustment instructions can include settings values (e.g., fan speed setting values, fan pitch setting values, pump speed setting values, compressor speed setting values, etc.), activation or deactivation commands, or power usage values (e.g., percentages, kW-h values, etc.).

Machine learning system 638 is operable to learn from effects (e.g., temperature changes, etc.) from auxiliary subsystem power usage reduction during operational adjustment(s) (e.g., temporary engagement(s), other operational adjustment(s)) to output, as machine learning outputs, temporary auxiliary subsystem power usage increases to better compensate for the effects of auxiliary subsystem power usage reductions. For example, machine learning system 638 can ingest and compare temperatures sensor data (e.g., powerplant associated temperatures or operator compartment temperatures) before and after operational adjustment(s) (e.g., temporary engagements, other operational adjustment(s)), as well as the power adjustment instructions for adjusting power usage before and during the operational adjustment(s) (e.g., temporary engagement(s), other operational adjustment(s)), to learn, identify, and provide as learning outputs, more effective temporary auxiliary subsystem power usage increases prior to the operational adjustment(s) (e.g., temporary engagement(s), other operational adjustment(s)) to eliminate or reduce the effects from auxiliary subsystem power usage reduction during operational adjustment(s) (e.g., temporary engagement(s), other operational adjustment(s)). As explained above, the learning outputs can be utilized by power usage increase identification system 658.

As can be seen, power management system 215 is operable to generate, based on one or more items of data 205/305 one or more power management outputs 660. Power management outputs 660 can include one or more power usage identifications, one or more operational adjustment identifications (e.g., temporary engagement identifications, other operational adjustment identifications), one or more power usage adjustment instructions, as well as various other items or information. The power management outputs 660 can be provided to a control system 214 for controlling items of a work machine 100, such as one or more controllable subsystems 216 or one or more interface mechanisms 218 (e.g., to generate presentations based on or indicative of the outputs 660), as well as other items of a work machine 100. The power management outputs 660 can be provided to various other items 362 of system 500, such as one or more interface mechanisms 364 (e.g., to generate presentations based on or indicative of the outputs 660).

Figure 4A:
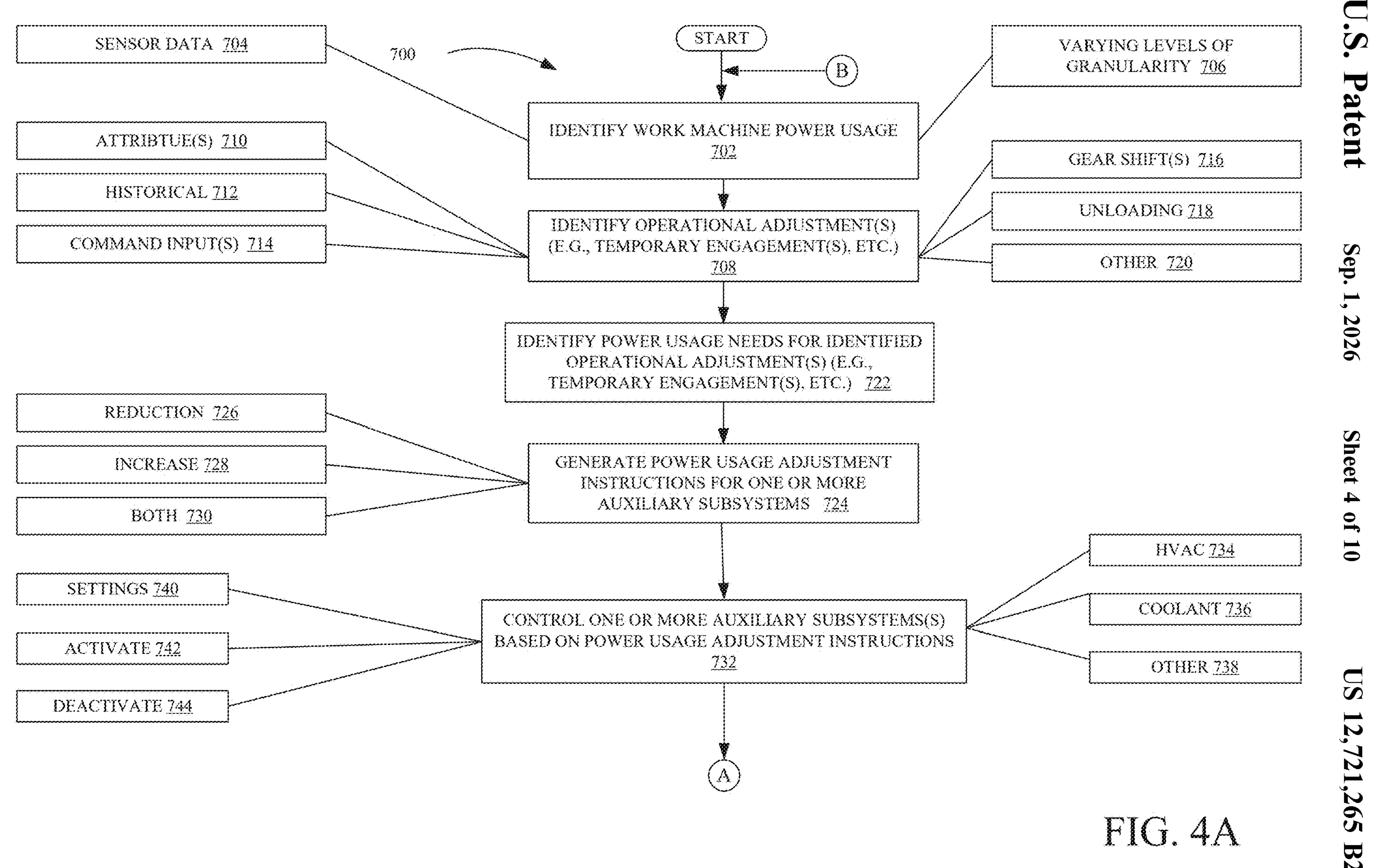
FIGS. 4A and 4B (collectively referred to herein as FIG. 4) show a flow diagram illustrating one example operation of an agricultural system architecture in performing power management and machine control.
Figure 4B:
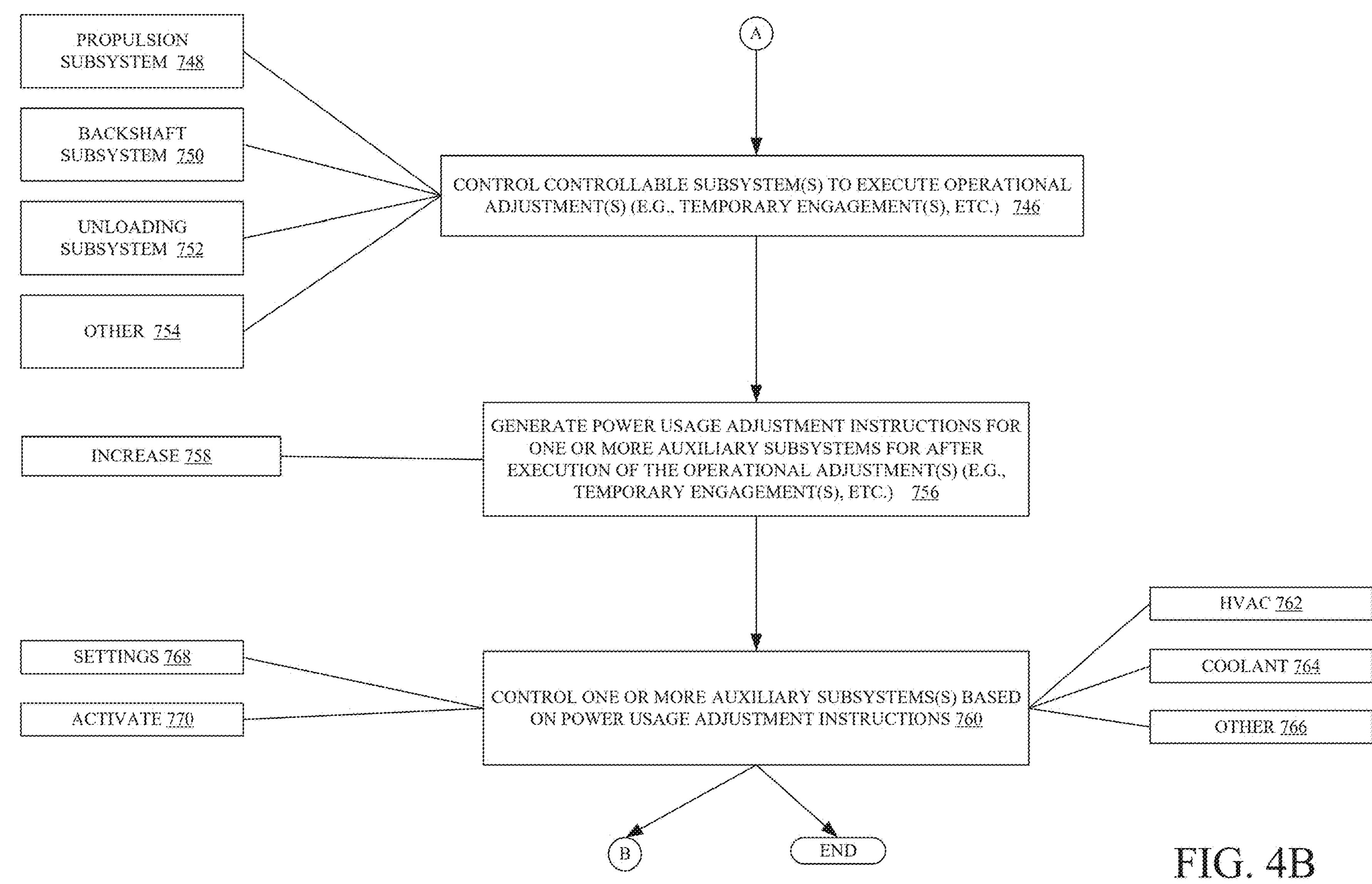

FIGS. 4A and 4B (collectively referred to herein as FIG. 4) show a flow diagram illustrating an example operation 700 of agricultural system 500 in performing power management and machine control.

At block 702, power management system 215 (e.g., power usage identification system 632) identifies power usage across a work machine 100. As indicated by block 704, power management system 215 can identify the power usage across the work machine based, at least, on sensor data 603, such as power sensor data generated by power sensors 209. As indicated by block 706, power management system 215 can identify power usage at varying levels of granularity, such as one or more of machine-wide power usage, on a subsystem level (e.g., power usage for each subsystem 216), on a component level (e.g., power usage for each power consuming component of the one or more subsystems 216).

At block 708, power management system 215 (e.g., operational adjustment identification system 634) identifies one or more operational adjustments (e.g., temporary engagements, other operational adjustments) to be executed by the agricultural work machine 100. As indicated by block 710, power management system 215 can identify one or more operational adjustments (e.g., temporary engagements, other operational adjustments) based on attributes at the worksite (e.g., crop attributes, terrain attributes, fill level, etc.), which can be provided by sensor data 603 (e.g., observation sensor data generated by observation sensor systems 227, fill level sensor data generated by fill level sensors 226) or worksite data 601. As indicated by block 712, power management system 215 can identify one or more operational adjustments (e.g., temporary engagements, other operational adjustments) based on historical power usage or historical operational adjustments (e.g., historical temporary engagements, other historical operational adjustments) at the worksite, which can be provided by historical data 602. As indicated by block 714, power management system 215 can identify one or more operational adjustments (e.g., temporary engagements, other operational adjustments) based on operational adjustment (e.g., temporary engagement, other operational adjustment) command inputs (e.g., provided by operator or user or by control system 214), which can be indicated by sensor data 603 (e.g., input sensor data generated by input sensors 209). An operational adjustment can be a temporary engagement. As indicated by block 716, a temporary engagement can be execution of a gear shift, such as a transmission gear shift of transmission 262 or a transmission gear shift of transmission 268. As indicated by block 718, a temporary engagement can be execution of an unloading operation by unloading subsystem 252, which can include activation of one or more actuators 272. An operational adjustment can be various other operational adjustments or various other temporary engagements. As indicated by block 720, system 215 can identify various other operational adjustments, including various other temporary engagements.

At block 722, power management system 215 (e.g., power usage adjustment identification system 636) identifies a power usage adjustment need associated with the one or more operational adjustments (e.g. identified temporary adjustments, other operational adjustments).

At block 724, power management system 215 (e.g., power usage adjustment identification system 636) generates power usage adjustment instructions to adjust power usage of one or more auxiliary subsystems 254 to compensate for the one or more identified operational adjustments (e.g., identified temporary engagements, other identified operational adjustments). As indicated by block 726, the power usage adjustment instructions can include power usage reduction instructions for reducing (or eliminating) the power usage of the one or more auxiliary subsystems 254 during execution of the one or more operational adjustments (e.g., temporary engagements, other operational adjustments). As indicated by block 728, the power usage adjustment instructions can include power usage increase instructions for temporarily increasing the power usage of the one or more auxiliary subsystem 254 prior to execution of the one or more operational adjustments (e.g., temporary engagements, other operational adjustments). As indicated by block 730, the power usage adjustment instructions can include both power usage reduction instructions and power usage increase instructions.

At block 732, system 500 (e.g., control system 214) controls one or more auxiliary subsystems 254 based on the power usage adjustment instructions generated at block 724. As indicated by block 734, the one or more auxiliary subsystems 254 can include an HVAC subsystem 255. As indicated by block 736, the one or more auxiliary subsystems 254 can include a coolant subsystem 256. As indicated by block 736, the one or more auxiliary subsystems 254 can include one or more of a variety of other auxiliary subsystems 257. As indicated by block 740, controlling the one or more auxiliary subsystems 254 can include adjusting settings (e.g., fan speed, fan pitch, pump speed, compressor speed, etc.) of one or more components of the one or more auxiliary subsystems 254. As indicated by block 742, controlling the one or more auxiliary subsystems 254 can include activating one or more of the auxiliary subsystems 254 (or components thereof). As indicated by block 744, controlling the one or more auxiliary subsystems 254 can include deactivating one or more of the auxiliary subsystems 254 (or components thereof).

At block 746, system 500 (e.g., control system 214) controls one or more controllable subsystems 216 to perform the one or more operational adjustments (e.g., temporary engagements, other operational adjustments). As indicated by block 748, controlling the one or more controllable subsystems 216 can include controlling propulsion subsystem 250 such as to change a gear of transmission 262. As indicated by block 750, controlling the one or more controllable subsystems 216 can include controlling backshaft subsystem 251 such as to change a gear of transmission 268. As indicated by block 752, controlling the one or more controllable subsystems 216 can include controlling unloading subsystem 252 such as to activate or control one or more actuators 272. As indicated by block 754, controlling one or more controllable subsystems 216 can include controlling one or more other controllable subsystems 258.

At block 756, power management system 215 (e.g., power usage adjustment identification system 636) generates power usage adjustment instructions to adjust power usage of one or more auxiliary subsystems 254 after execution of the one or more identified operational adjustments (e.g., temporary engagements, other operational adjustments). As indicated by block 758, the power usage adjustment instructions can include power usage increase instructions for increasing the power usage of the one or more auxiliary subsystem 254 after execution of the one or more identified operational adjustments (e.g., temporary engagements, other operational adjustments).

At block 760, system 500 (e.g., control system 214) controls one or more auxiliary subsystems 254 based on the power usage adjustment instructions generated at block 756. As indicated by block 762, the one or more auxiliary subsystems 254 can include an HVAC subsystem 255. As indicated by block 764, the one or more auxiliary subsystems 254 can include a coolant subsystem 256. As indicated by block 766, the one or more auxiliary subsystems 254 can include one or more of a variety of other auxiliary subsystems 257. As indicated by block 768, controlling the one or more auxiliary subsystems 254 can include adjusting settings (e.g., fan speed, fan pitch, pump speed, compressor speed, etc.) of one or more components of the one or more auxiliary subsystems 254. As indicated by block 770, controlling the one or more auxiliary subsystems 254 can include activating one or more of the auxiliary subsystems 254 (or components thereof).

If the agricultural work machine is still performing the agricultural operation at the worksite, processing returns to block 702. If the agricultural work machine has finished performing the agricultural operation, processing ends.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms can include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition can be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores can be local to the systems accessing the data stores, one or more of the data stores can all be located remote form a system utilizing the data store, or one or more data stores can be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality can be distributed among more components. In different examples, some functionality can be added, and some can be removed.

It will be noted that the above discussion has described a variety of different systems, models, logic, controllers, components, and interactions. It will be appreciated that any or all of such systems, controllers, components, and interactions can be implemented by hardware items, such as one or more processors, one or more processors executing computer executable instructions stored in memory, memory, or other processing components, some of which are described below, that perform the functions associated with those systems, controllers, components, and interactions. In addition, any or all of the systems, controllers, components, and interactions can be implemented by software that is loaded into a memory and is subsequently executed by one or more processors or one or more servers or other computing component(s), as described below. Any or all of the systems, controllers, components, and interactions can also be implemented by different combinations of hardware, software, firmware, etc., some examples of which are described below. These are some examples of different structures that can be used to implement any or all of the systems, controllers, components, and interactions described above. Other structures can be used as well.

Figure 5:
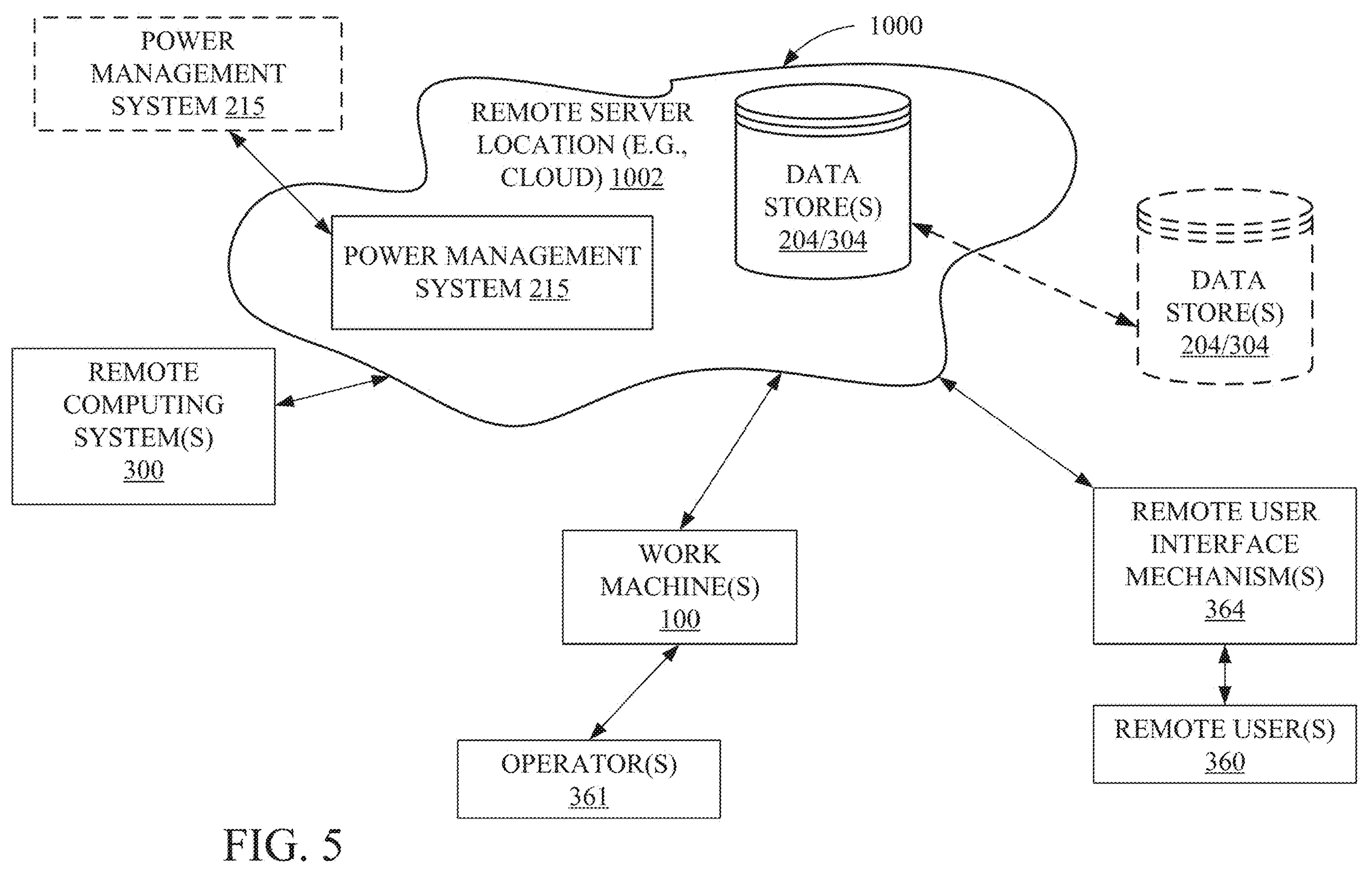
FIG. 5 is a block diagram showing one example of items of an agricultural system architecture in communication with a remote server architecture.

FIG. 5 is a block diagram of a remote server architecture 1000. FIG. 5, also shows one or more work machines 100, one or more remote computing systems 300, and one or more remote user interface mechanisms 364, in communication with the remote server environment. The work machines 100, remote computing systems 300, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and can be accessible through a web browser or any other computing component. Software or components shown in previous figures as well as data associated therewith, can be stored on servers at a remote location. The computing resources in a remote server environment can be consolidated at a remote data center location, or the computing resources can be dispersed to a plurality of remote data centers. Remote server infrastructures can deliver services through shared data centers, even though the services appear as a single point of access for the user. Thus, the components and functions described herein can be provided from a remote server at a remote location using a remote server architecture. Alternatively, the components and functions can be provided from a server, or the components and functions can be installed on client devices directly, or in other ways.

In the example shown in FIG. 5, some items are similar to those shown in previous figures and those items are similarly numbered. FIG. 5 specifically shows that power management system 215, data stores 204, or data stores 304 or a combination thereof, can be located at a server location 1002 that is remote from the work machines 100, remote computing systems 300, and remote user interface mechanisms 364. Therefore, in the example shown in FIG. 5, work machines 100, remote computing systems 300, and remote user interface mechanisms 364 access systems through remote server location 1002. In other examples, various other items can also be located at server location 1002, such as various other items of agricultural system architecture 500.

FIG. 5 also depicts another example of a remote server architecture. FIG. 5 shows that some elements of previous figures can be disposed at a remote server location 1002 while others can be located elsewhere. By way of example, one or more of data store(s) 204 or 304 can be disposed at a location separate from location 1002 and accessed via the remote server at location 1002. Similarly, power management system 315 can be disposed at a location separate from location 1002 and accessed via the remote server at location 1002. Regardless of where the elements are located, the elements can be accessed directly by work machines 100, remote computing systems 300, and remote user interface mechanisms 364 through a network such as a wide area network or a local area network; the elements can be hosted at a remote site by a service; or the elements can be provided as a service or accessed by a connection service that resides in a remote location. Also, data can be stored in any location, and the stored data can be accessed by, or forwarded to, operators, users, or systems. For instance, physical carriers can be used instead of, or in addition to, electromagnetic wave carriers. In some examples, where wireless telecommunication service coverage is poor or nonexistent, another machine, such as a fuel truck or other mobile machine or vehicle, can have an automated, semi-automated or manual information collection system. As a mobile machine (e.g., work machine 100) comes close to the machine containing the information collection system, such as a fuel truck prior to fueling, or other mobile machine or vehicle, the information collection system collects the information from the mobile machine (e.g., work machine 100) using any type of ad-hoc wireless connection. The collected information can then be forwarded to another network when the machine containing the received information reaches a location where wireless telecommunication service coverage or other wireless coverage is available. For instance, a fuel truck, can enter an area having wireless communication coverage when traveling to a location to fuel other machines or when at a main fuel storage location. Other mobile machines or vehicles can enter an area having wireless communication coverage when traveling to other locations or when at another location. All of these architectures are contemplated herein. Further, the information can be stored on a mobile machine (e.g., work machine 100) until the mobile machine enters an area having wireless communication coverage. The mobile machine (e.g., work machine 100), itself, can send the information to another network.

It will also be noted that the elements of previous figures, or portions thereof, can be disposed on a wide variety of different devices. One or more of those devices can include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 can include cybersecurity measures. Without limitation, these measures can include encryption of data on storage devices, encryption of data sent between network nodes, authentication of people or processes accessing data, as well as the use of ledgers for recording metadata, data, data transfers, data accesses, and data transformations. In some examples, the ledgers can be distributed and immutable (e.g., implemented as blockchain).

Figure 6:
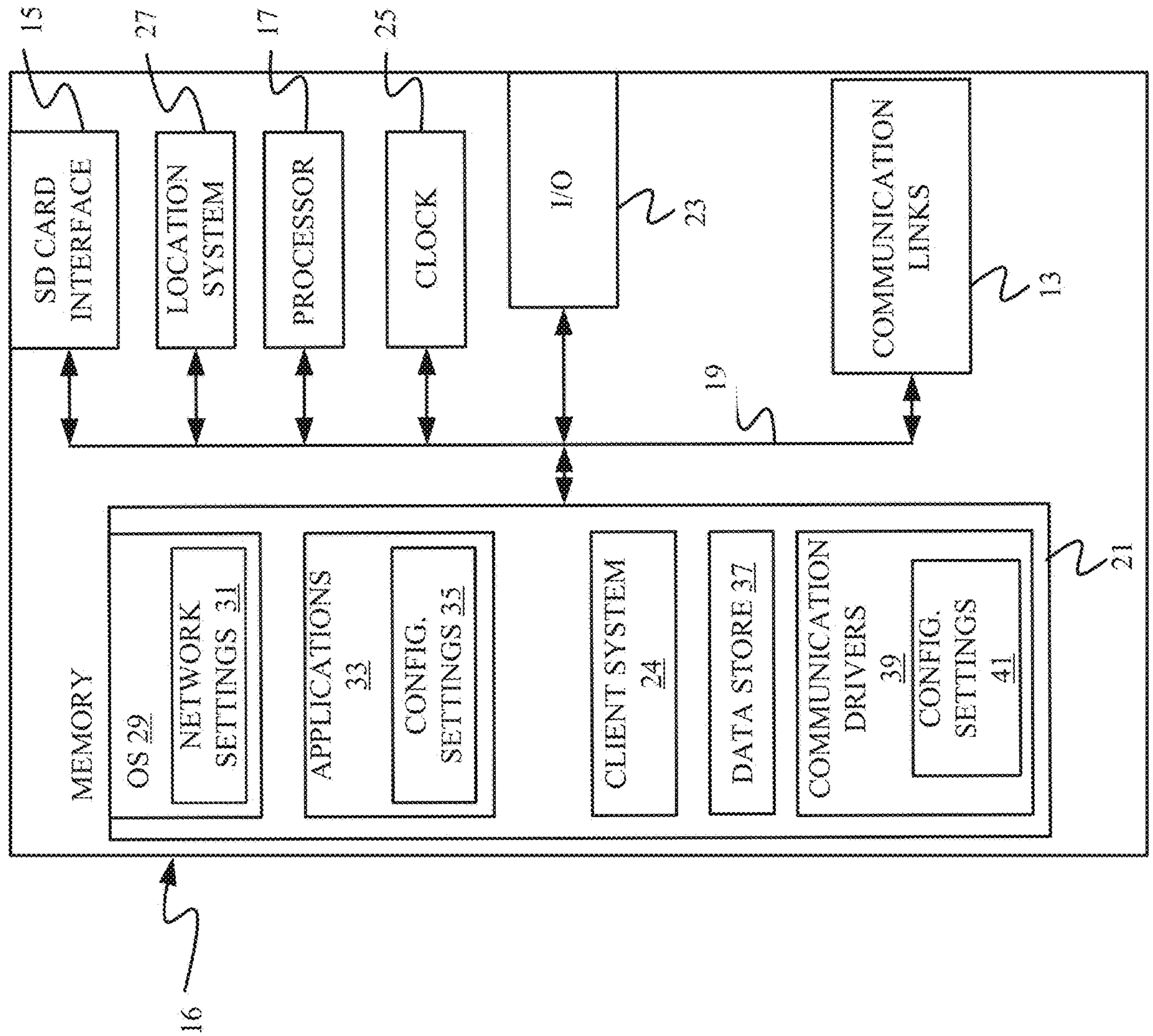
FIGS. 6, 7, and 8 show examples of mobile devices that can be used in an agricultural system architecture.
Figure 7:
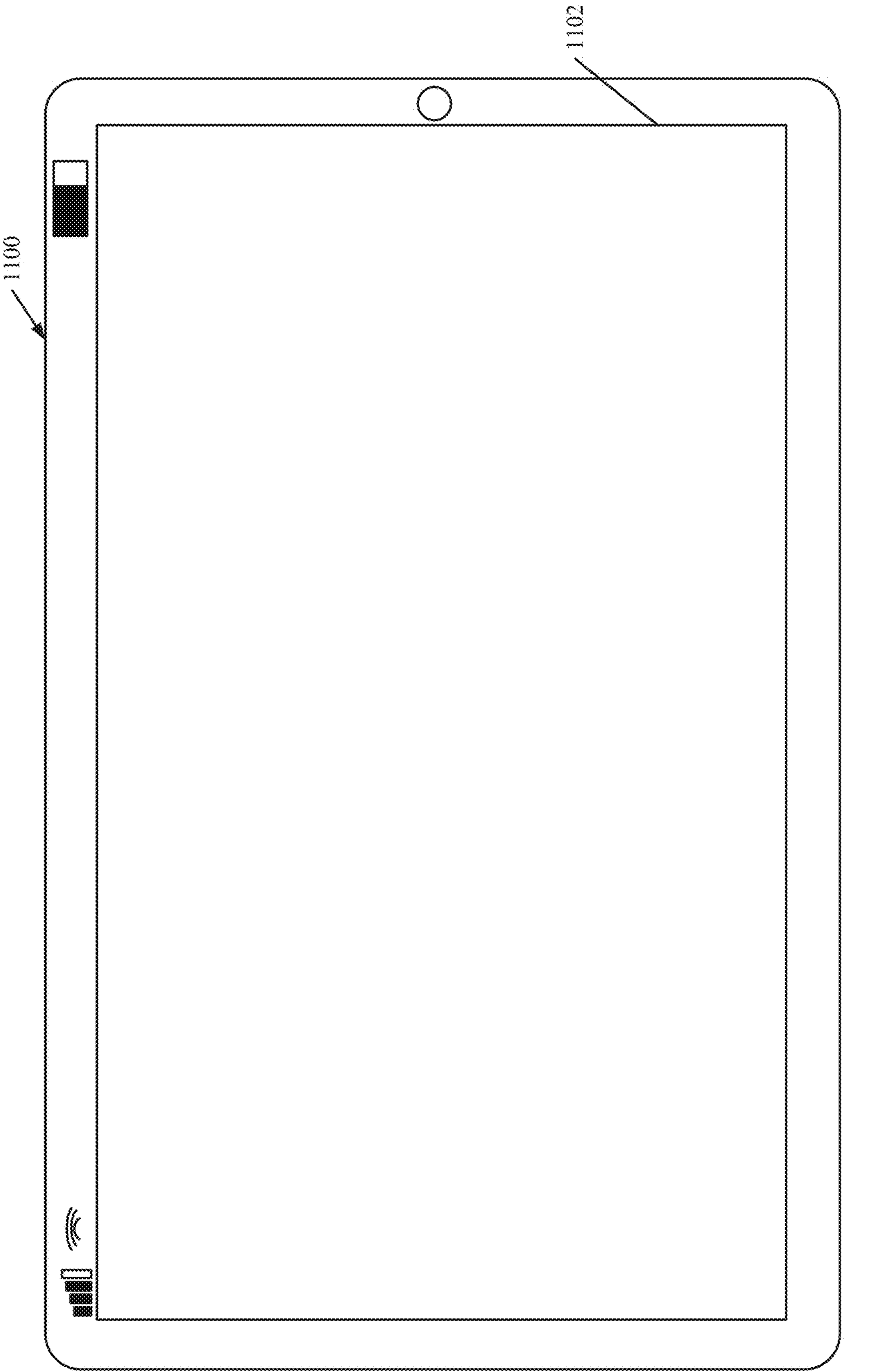
Figure 8:
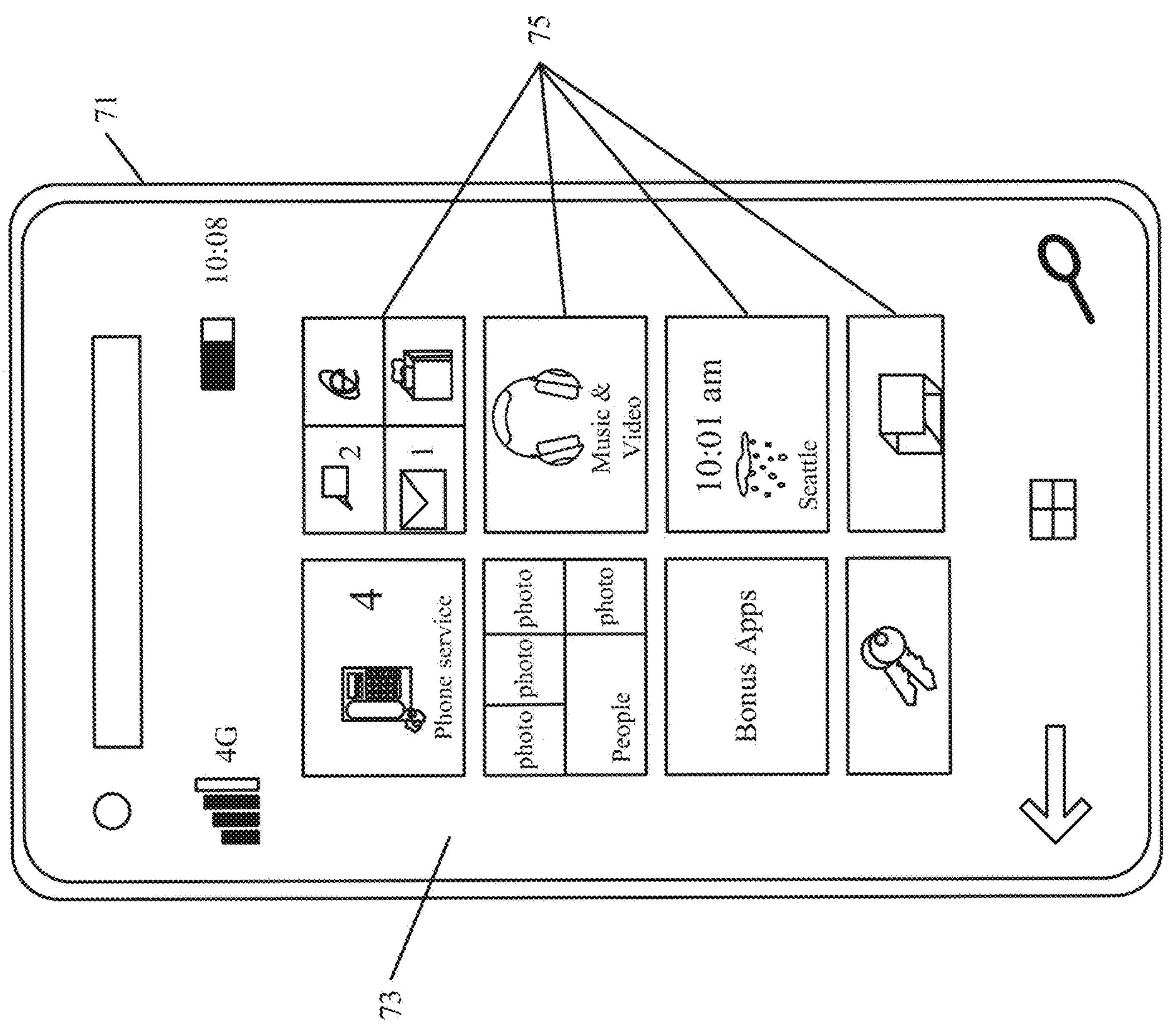

FIG. 6 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., work machine 100) or can be communicably coupled to a mobile machine (e.g., work machine 100) for use in generating, processing, or displaying the outputs (e.g., 660) discussed above. FIGS. 7 and 8 are examples of handheld or mobile devices.

FIG. 6 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 1100. In FIG. 7, computer 1100 is shown with user interface display screen 1102. Screen 1102 can be a touch screen or a pen-enabled interface that receives inputs from a pen or stylus. Tablet computer 1100 can also use an on-screen virtual keyboard. Of course, computer 1100 can also be attached to a keyboard or other user input device through a suitable attachment mechanism, such as a wireless link or USB port, for instance. Computer 1100 can also illustratively receive voice inputs as well.

FIG. 8 is similar to FIG. 7 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
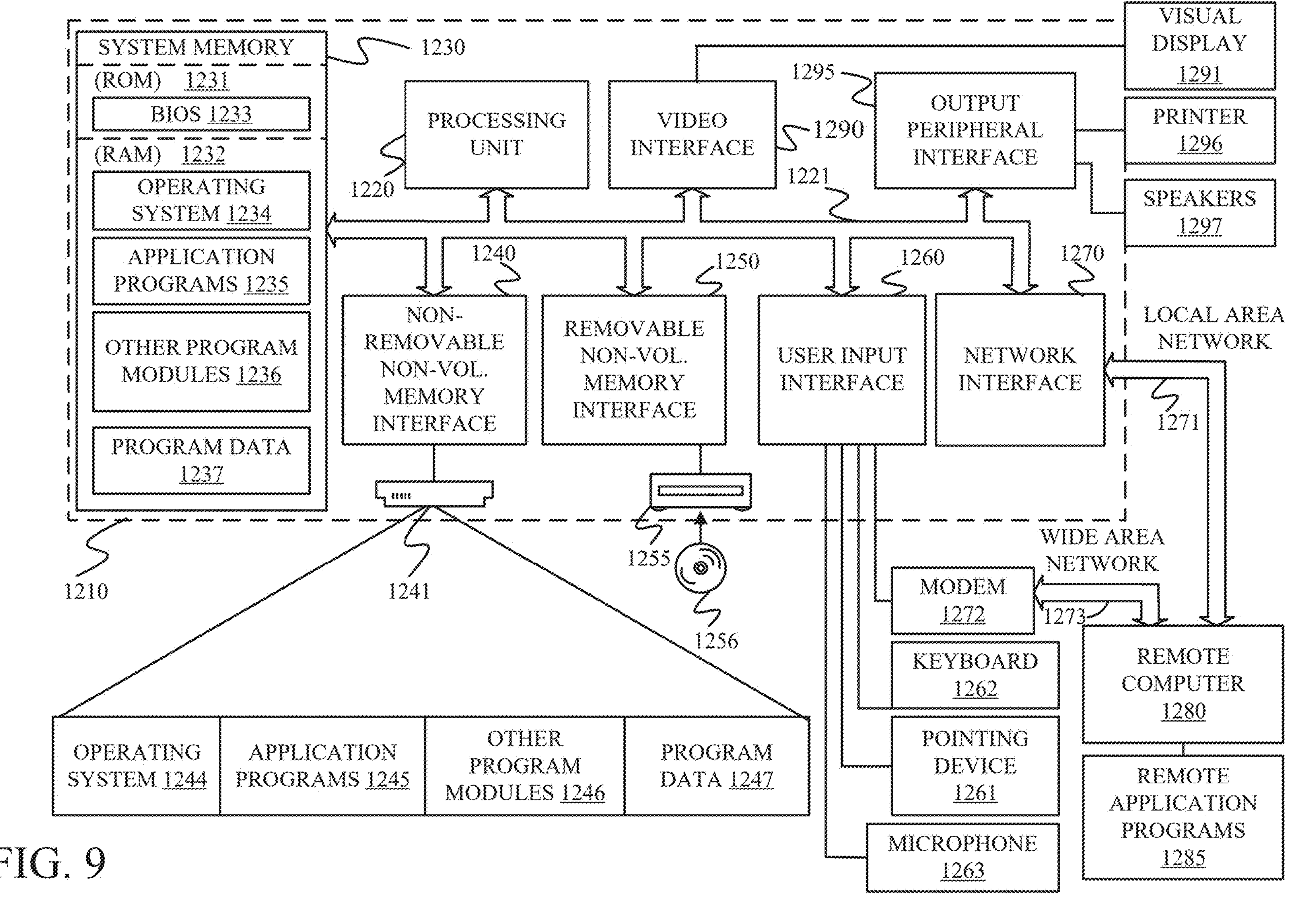
FIG. 9 is a block diagram showing one example of a computing environment that can be used in an agricultural system architecture.

FIG. 9 is one example of a computing environment in which elements of previous figures described herein can be deployed. With reference to FIG. 9, an example system for implementing some embodiments includes a computing device in the form of a computer 1210 programmed to operate as discussed above. Components of computer 1210 can include, but arc not limited to, a processing unit 1220 (which can comprise processors or servers from previous figures), a system memory 1230, and a system bus 1221 that couples various system components including the system memory to the processing unit 1220. The system bus 1221 can be any of several types of bus structures including a memory bus or memory controller, a peripheral bus, and a local bus using any of a variety of bus architectures. Memory and programs described with respect to previous figures described herein can be deployed in corresponding portions of FIG. 9.

Computer 1210 typically includes a variety of computer readable media. Computer readable media can be any available media that can be accessed by computer 1210 and includes both volatile and nonvolatile media, removable and non-removable media. By way of example, and not limitation, computer readable media can comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media can embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 9 illustrates operating system 1234, application programs 1235, other program modules 1236, and program data 1237.

The computer 1210 can also include other removable/non-removable volatile/nonvolatile computer storage media. By way of example only, FIG. 9 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), quantum computers, etc.

The drives and their associated computer storage media discussed above and illustrated in FIG. 9, provide storage of computer readable instructions, data structures, program modules and other data for the computer 1210. In FIG. 9, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user can enter commands and information into the computer 1210 through input devices such as a keyboard 1262, a microphone 1263, and a pointing device 1261, such as a mouse, trackball or touch pad. Other input devices (not shown) can include a joystick, game pad, satellite dish, scanner, or the like. These and other input devices are often connected to the processing unit 1220 through a user input interface 1260 that is coupled to the system bus, but can be connected by other interface and bus structures. A visual display 1291 or other type of display device is also connected to the system bus 1221 via an interface, such as a video interface 1290. In addition to the monitor, computers can also include other peripheral output devices such as speakers 1297 and printer 1296, which can be connected through an output peripheral interface 1295.

The computer 1210 is operated in a networked environment using logical connections (such as a controller area network-CAN, local area network-LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules can be stored in a remote memory storage device. FIG. 9 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:

one or more processors;

memory storing instruction, executable by the one or more processors, that, when executed by the one or more processors, cause the one or more processors to:

identify power usage across an agricultural work machine;

identify a temporary engagement to be executed by the agricultural work machine;

identify a power usage need associated with the temporary engagement;

generate, based on the power usage and the power usage need associated with the temporary engagement, power usage adjustment instructions comprising an adjustment to the power usage; and control one or more auxiliary subsystems based on the power usage adjustment instructions.

2. The agricultural system of claim 1, wherein the temporary engagement comprises one of a transmission gear shift or activation of an unloading subsystem.

3. The agricultural system of claim 1, wherein the instructions, when executed by the one or more processors, cause the one or more processors to identify the temporary engagement based on one or more of worksite data, historical data, or sensor data.

4. The agricultural system of claim 1, wherein the power usage adjustment instructions include power usage reduction instructions and wherein the instructions, when executed by the one or more processors, cause the one or more processors to generate the power usage reduction instructions based on the power usage need associated with the temporary engagement.

5. The agricultural system of claim 4, wherein the one or more auxiliary subsystems comprise one or more of a coolant subsystem or a heating, ventilation, and air condition (HVAC) subsystem.

6. The agricultural system of claim 4, wherein the power usage reduction instructions include instructions to at least one of:

deactivate one or more of the one or more auxiliary subsystems; or change a setting of one or more components of the one or more auxiliary subsystems.

7. The agricultural system of claim 1, wherein the power usage across the agricultural work machine comprises a total power usage of the agricultural work machine.

8. The agricultural system of claim 4, wherein the power usage adjustment instructions further include power usage increase instructions and wherein the instructions, when executed by the one or more processors, cause the one or more processors to control the one or more auxiliary subsystems to increase power usage of the one or more auxiliary subsystems prior to execution of the temporary engagement.

9. A computer implemented method of controlling an agricultural work machine comprising:

identifying power usage across the agricultural work machine;

identifying a temporary engagement to be executed by the agricultural work machine, wherein identifying the temporary engagement comprises identifying the temporary engagement based on one or more of worksite data, historical data, or sensor data;

generating power usage adjustment instructions based on the temporary engagement; and controlling one or more auxiliary subsystems based on the power usage adjustment instructions.

10. The computer implemented method of claim 9 and further comprising identifying a power usage need associated with the temporary engagement and wherein generating the power usage adjustment instructions comprises generating the power usage adjustment instructions including power usage reduction instructions based on the power usage need associated with the temporary engagement.

11. The computer implemented method of claim 10, wherein controlling the one or more auxiliary subsystems comprises controlling, as the one or more auxiliary subsystems, one or more of a coolant subsystem or a heating, ventilation, and air condition (HVAC) subsystem.

12. The computer implemented method of claim 10, wherein generating the power usage reduction instructions includes generating the power usage reduction instructions including instructions to deactivate one or more of the one or more auxiliary subsystems.

13. The computer implemented method of claim 10, wherein generating the power usage reduction instructions includes generating the power usage reduction instructions including instructions to change a setting of one or more components of the one or more auxiliary subsystems.

14. The computer implemented method of claim 10, wherein generating the power usage adjustment instructions comprises generating the power usage adjustment instructions including power usage increase instructions and wherein controlling the one or more auxiliary subsystems comprises controlling the one or more auxiliary subsystems to increase power usage of the one or more auxiliary subsystems prior to execution of the temporary engagement.

15. An agricultural work machine comprising:

a first controllable subsystem;

a second controllable subsystem;

one or more processors;

memory storing instruction, executable by the one or more processors, that, when executed by the one or more processors, cause the one or more processors to:

identify power usage across the agricultural work machine;

identify a temporary engagement to be executed by the first controllable subsystem;

identify a power usage need associated with the temporary engagement;

based on the power usage and the power usage need associated with the temporary engagement, generate power usage adjustment instructions; and control the second controllable subsystem based on the power usage adjustment instructions.

16. The agricultural work machine of claim 15, wherein the first controllable subsystem comprises one of a propulsion subsystem, a backshaft subsystem, or an unloading subsystem and wherein the second controllable subsystem comprises one of a coolant subsystem or a heating, ventilation, and air condition (HVAC) subsystem.

17. The agricultural work machine of claim 16, wherein the power usage adjustment instructions include power usage reduction instructions and wherein the instructions, when executed by the one or more processors, cause the one or more processors to identify a power usage need associated with the temporary engagement, generate the power usage reduction instructions based on the power usage need associated with the temporary engagement, and control the second controllable subsystem based on the power usage reduction instructions to decrease power usage of the second controllable subsystem during execution of the temporary engagement.

18. The agricultural work machine of claim 17, wherein the power usage adjustment instructions further include power usage increase instructions and wherein the instructions, when executed by the one or more processors, cause the one or more processors to control the second controllable subsystem to increase power usage of the second controllable subsystem prior to execution of the temporary engagement.

19. The computer implemented method of claim 9, wherein identifying the temporary engagement comprises identifying, as the temporary engagement, one of a transmission gear shift or activation of an unloading subsystem.

* * * * *